(12) United States Patent
Takenoshita et al.

(10) Patent No.: US 7,815,140 B2
(45) Date of Patent: Oct. 19, 2010

(54) RECORDING TAPE CARTRIDGE

(75) Inventors: Kenji Takenoshita, Kanagawa (JP); Shozo Onmori, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/382,198

(22) Filed: Mar. 11, 2009

(65) Prior Publication Data

US 2009/0283620 A1 Nov. 19, 2009

(30) Foreign Application Priority Data

| Mar. 11, 2008 | (JP) | ............................... 2008-061241 |
| Mar. 11, 2008 | (JP) | ............................... 2008-061242 |
| Mar. 11, 2008 | (JP) | ............................... 2008-061243 |

(51) Int. Cl.
*G03B 1/58* (2006.01)

(52) U.S. Cl. ................................... 242/332.4; 242/348

(58) Field of Classification Search .............. 242/332.4, 242/348, 348.2, 532.6; 360/132
See application file for complete search history.

(56) References Cited

U.S. PATENT DOCUMENTS

| 3,154,261 | A | * | 10/1964 | Breuning ..................... 242/343 |
| 3,169,721 | A | * | 2/1965 | Laa et al. ................... 242/348.2 |
| 6,236,539 | B1 | * | 5/2001 | Morita et al. ................ 360/132 |
| 6,663,036 | B1 | * | 12/2003 | Ishihara et al. ............ 242/348.2 |
| 6,691,941 | B2 | * | 2/2004 | Imai ......................... 242/332.4 |
| 6,769,640 | B2 | * | 8/2004 | Schoettle et al. .......... 242/348.2 |
| 6,874,721 | B2 | * | 4/2005 | Aaron et al. ............... 242/348.2 |
| 6,880,778 | B2 | * | 4/2005 | Hiraguchi ..................... 242/348 |
| 7,014,138 | B2 | * | 3/2006 | Ishihara et al. ............ 242/348.2 |
| 7,028,938 | B2 | * | 4/2006 | Hiraguchi ................. 242/332.4 |
| 7,121,494 | B2 | * | 10/2006 | Shiga et al. ............... 242/348.2 |
| 7,201,341 | B2 | * | 4/2007 | Ishikawa et al. .......... 242/332.4 |
| 7,475,839 | B2 | * | 1/2009 | Hiraguchi et al. ......... 242/348.2 |
| 7,562,839 | B2 | * | 7/2009 | Takenoshita et al. ..... 242/332.4 |
| 2001/0000983 | A1 | * | 5/2001 | Morita et al. ................ 360/132 |
| 2001/0024343 | A1 | * | 9/2001 | Shiga et al. .................. 360/132 |
| 2002/0174725 | A1 | * | 11/2002 | Ishihara ......................... 73/796 |
| 2003/0089810 | A1 | * | 5/2003 | Schoettle et al. .......... 242/348.2 |
| 2003/0146330 | A1 | * | 8/2003 | Hiraguchi ................. 242/348.2 |
| 2003/0189120 | A1 | * | 10/2003 | Aaron et al. ............... 242/348.2 |
| 2004/0011909 | A1 | * | 1/2004 | Ishihara ..................... 242/348.2 |

(Continued)

FOREIGN PATENT DOCUMENTS

JP  2001-148179  5/2001

(Continued)

*Primary Examiner*—Evan H Langdon
(74) *Attorney, Agent, or Firm*—Jean C. Edwards, Esq.; Akerman Senterfitt

(57) ABSTRACT

A magnetic tape cartridge containing a tape reel to which a magnetic tape with a leader pin attached to a leading end is wound is equipped with a leader pin retaining structure for safe and secure retention of the leader pin immediately behind a tape egress/ingress opening. The leader pin retaining structure comprises a retainer member having resilient arms and a leader pin support for supporting the retainer member so as to place tail end portions of the resilient arms across end collars of the leader pin received in sockets provided adjacent to the tape egress/ingress opening, wherein the leader pin support resiliently urges and bends the resilient arms so as to retain the end collars of the leader pin by the tail end portions of the resilient arms, respectively.

10 Claims, 22 Drawing Sheets

U.S. PATENT DOCUMENTS

| | | | |
|---|---|---|---|
| 2004/0021025 A1* | 2/2004 | Shiga et al. | 242/348.2 |
| 2004/0026552 A1* | 2/2004 | Hiraguchi | 242/348.2 |
| 2004/0026553 A1* | 2/2004 | Ishihara et al. | 242/348.2 |
| 2004/0075006 A1* | 4/2004 | Shiga et al. | 242/348.2 |
| 2005/0006515 A1* | 1/2005 | Sasaki et al. | 242/348.2 |
| 2005/0087640 A1* | 4/2005 | Ishihara et al. | 242/348.3 |
| 2005/0139709 A1* | 6/2005 | Shiga et al. | 242/348.2 |
| 2006/0180693 A1* | 8/2006 | Ishikawa et al. | 242/332.4 |
| 2008/0179437 A1* | 7/2008 | Takenoshita et al. | 242/324.2 |
| 2008/0179440 A1* | 7/2008 | Hiraguchi et al. | 242/348.1 |
| 2009/0084881 A1* | 4/2009 | Hiraguchi et al. | 242/348.2 |

FOREIGN PATENT DOCUMENTS

| | | |
|---|---|---|
| JP | 2006-209887 | 8/2006 |

\* cited by examiner

Fig. 6
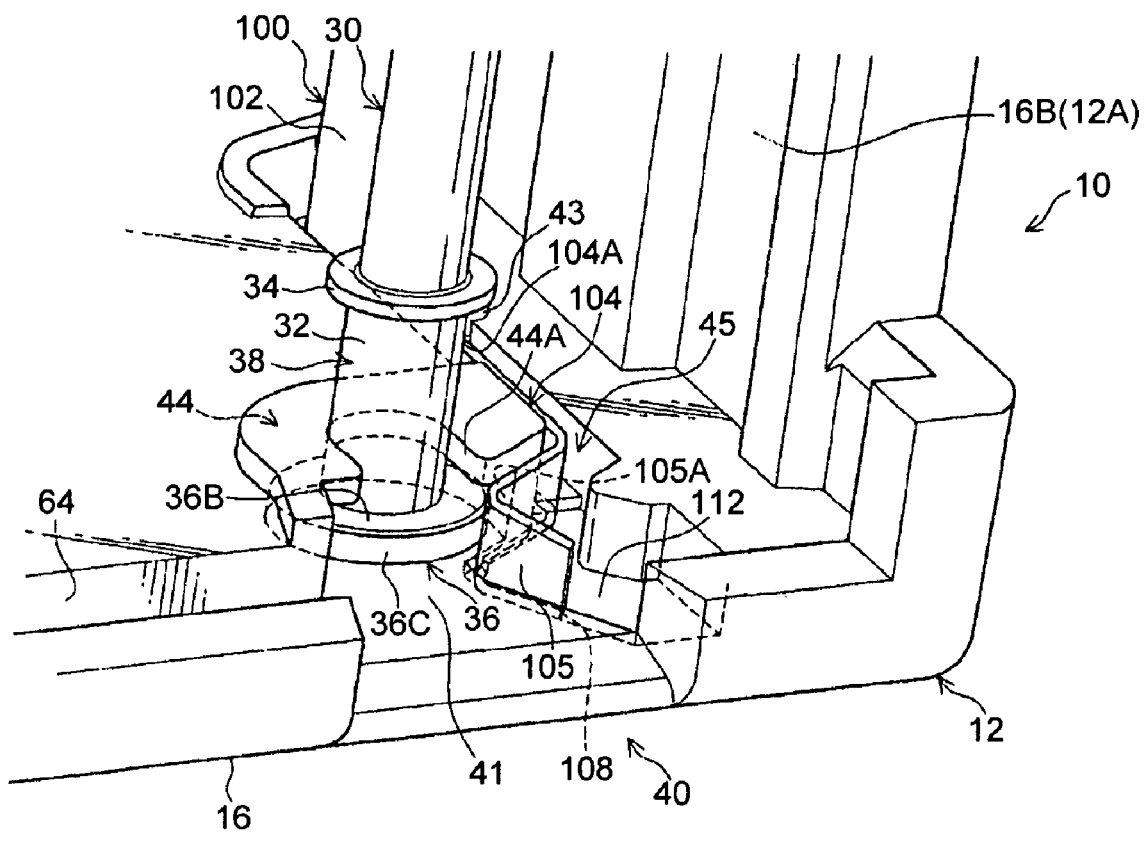
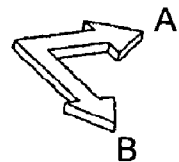

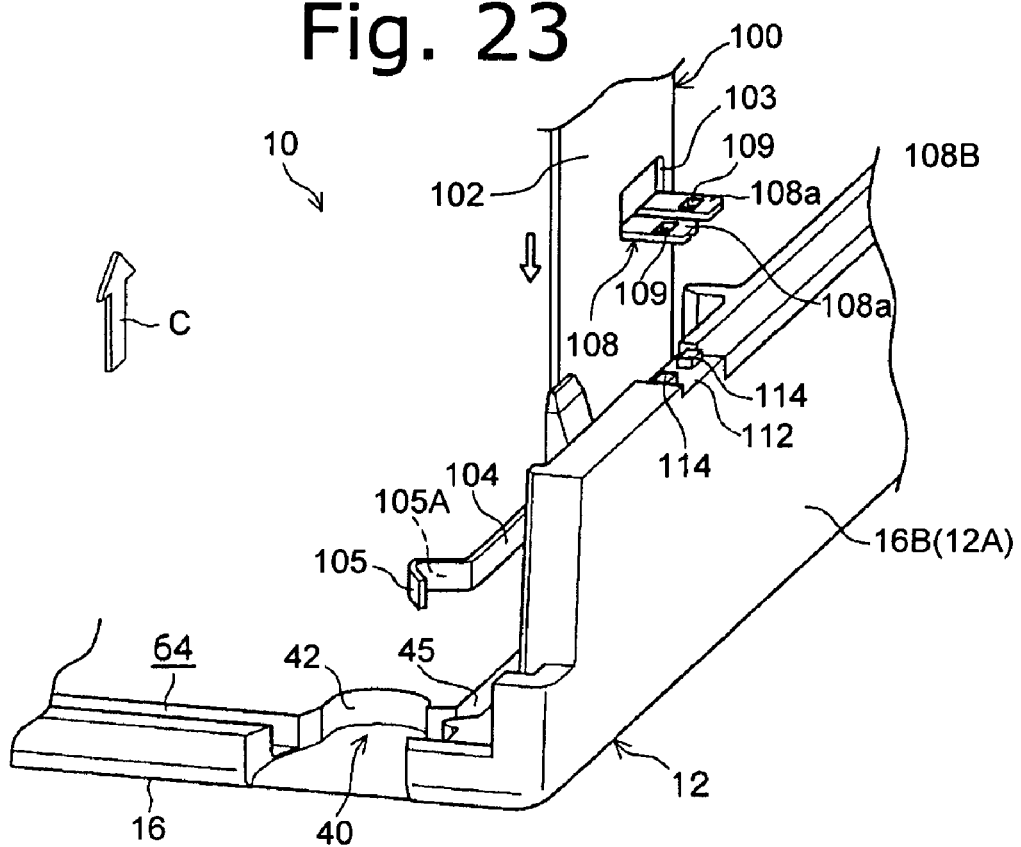
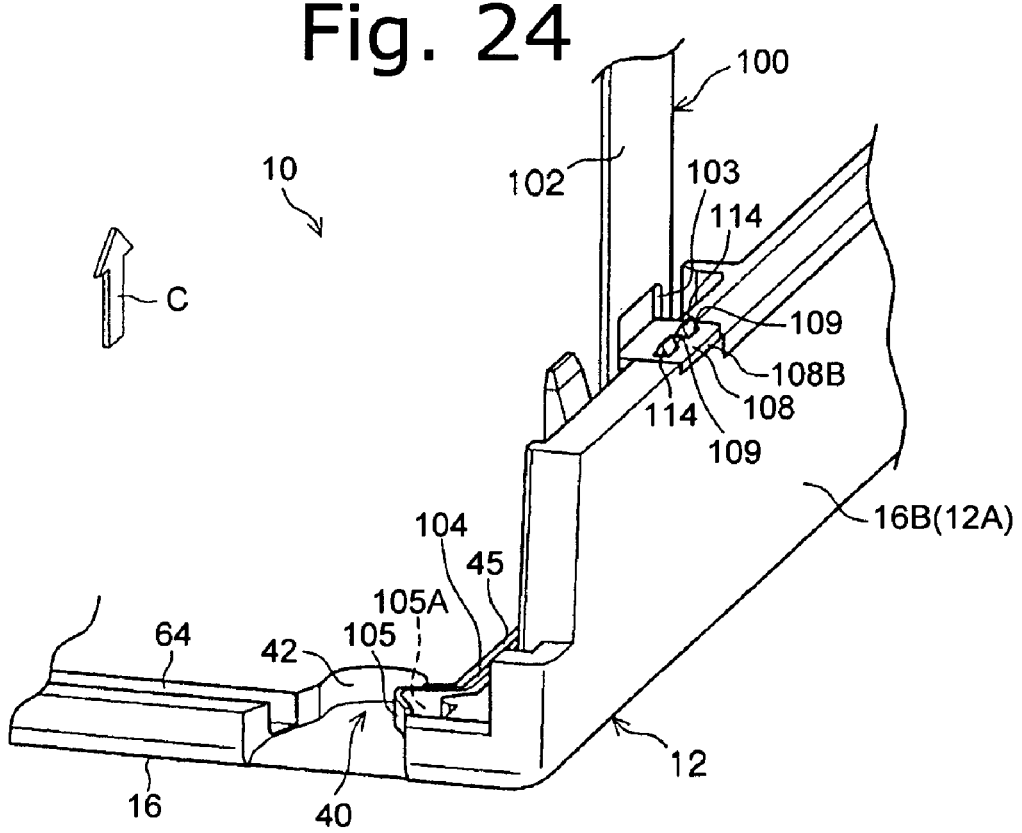

RECORDING TAPE CARTRIDGE

CROSS-REFERENCE TO RELATED APPLICATIONS

The present application claims priority from Japanese Patent Application No. 2008-061241, filed Mar. 11, 2008, Japanese Patent Application No. 2008-061242, filed Mar. 11, 2008, and Japanese Patent Application No. 2008-061243, filed Mar. 11, 2008, the contents of all of which are herein incorporated by reference in their entirety.

BACKGROUND OF THE INVENTION

1. Field of the Invention

The present invention relates to a magnetic tape cartridge having a cartridge case which contains a single tape reel on which a magnetic tape such as a data recording/data reproducing medium is wound.

2. Description of Related Art

Conventionally, there has been widely known a magnetic tape cartridge comprising a substantially rectangular cartridge case made up of two mating case shell halves, i.e. upper and lower case halves, and a single tape reel on which a magnetic tape such as a computer data recording/reproducing medium is wound and which is contained in the cartridge case. Access to the magnetic tape by a tape threading arm of an associated tape drive is provided by a leader pin attached to a leading end thereof, directly or through a leader tape. The leader pin is known in various forms including, for example, a dumbbell type leader pin which comprises a cylindrical bar with upper and lower end collars.

The dumbbell type leader pin such as described in JP2006-209887A is retained within the cartridge case with the upper and lower end collars received in a pair of leader pin sockets and urged by biasing means such a leaf spring, respectively, which are located adjacent to a tape egress/ingress opening in upper and lower case halves, respectively, when the magnetic tape cartridge is in no use or unloaded from the associated tape drive (during storage or delivery). That is, the leader pin is retained with its axis in parallel with a direction of the height of cartridge case. This type of leader pin is formed slightly shorter than a height of the tape egress/ingress opening for withdrawing from and drawing into the cartridge case through the tape egress/ingress opening. Therefore, a slight clearance is produced between the upper end collar of the leader pin and the leader pin socket of the upper case half and. Further, since the biasing leaf spring is mounted in a mounting groove formed in each of the upper and lower case halves, a clearance is produced between the biasing leaf spring and the bottom of the mounting groove after assembled to the cartridge case. These is clearance result in a difference between contact areas or depressing force of the leaf biasing leaf springs against the upper and lower end collars of the leader pin, respectively. In such a case, it is difficult for the leader pin to be safely and securely retained in place.

There has been known another type of magnetic tape cartridge such as described in JP2001-148179A which prevents upper and lower end collars of a leader pin from slipping out of the leader pin sockets. This socket has a recessed bottom or undercut adapted for sinking of the leader pin. The leader pin used in the magnetic tape cartridge has an end collar made thin so as to easily slip into the recessed bottom. This thin end color results in loose contact with the biasing leaf spring due to a decrease in contact area. Consequently, it is difficult for the leader pin to be safely and securely retained in place.

SUMMARY OF THE INVENTION

It is therefore an object of the present invention to provide a magnetic tape cartridge in which a leader pin is safely and securely retained when the magnetic tape cartridge is in no use.

In one aspect of the present invention, there is provided a magnetic tape cartridge including a substantially rectangular cartridge case formed by upper and lower case halves joined together, a tape reel assembly with a magnetic tape wound thereto which is rotatably enclosed in the cartridge case, a leader pin comprising having end collars at opposite ends thereof, respectively, which is attached to a leading end of the magnetic tape, and a leader pin retaining structure for retaining the leader pin in place in the cartridge case. The leader pin retaining structure comprises a retainer member having a pair of resilient arms separated in parallel with each other, each resilient arm having an tail end portion, support means for supporting the retainer member including the resilient arms except the tail end portions, and leader pin socket means, provided adjacent to the tape egress/ingress opening in the cartridge case and having upper and lower bearing surfaces formed in the upper and lower case halves, respectively, for receiving the leader pin with at least one of the end collars against the bearing surface, wherein the supporting means resiliently urges and bends each of the resilient arms of the retainer member so as to place the tail end portion of the each resilient arm in a pathway of the end collar of the leader pin while charging the resilient arm with resilience, thereby retaining the end collars of the leader pin by the tail end portions of the resilient arms, respectively. The leader pin retaining structure preferably comprise at least one bracket formed so as to partly overlap one of the end collars of the leader pin received in the leader pin socket means.

The support means may comprise a support groove, formed in each of the upper and lower case halves, in which at last each resilient arm is received and urging means, provided in the support groove, for urging and bending the resilient arm so as to charge the resilient arm with resilience. Further, the support means may further comprise a recessed apron lying between each bearing surface of each bearing surface and each support groove and below each bearing surface and partly extending into the pathway so as to permit movement of each tail end portion of the resilient arm.

Preferably, the tail end portion of at least either one of the resilient arms has a width greater than the resilient arm. More specifically, the tail end portion of at least either one of the resilient arms may be extended laterally outward as an outer rim or, preferably, laterally outward and inward as outer and inner rims, respectively.

Preferably, the magnetic tape cartridge further comprises mounting means for fixedly mounting the retainer member to the substantially rectangular cartridge case in a predetermined position with respect to the leader pin socket means. The mounting means may comprise a mounting tab formed as an integral part of the retainer member and a detention opening, formed complementarily to the mounting tab in a peripheral wall of the substantially rectangular cartridge case, into which the mounting tab is fitted. The detention opening comprises a recess formed in a top of a peripheral wall of at least one of the upper and lower case halves.

The mounting means may further comprise coupling means, provided between the mounting tab and the recess, for coupling the retainer member to the cartridge case, the coupling means comprising at least one pair of depression and projection engageable with each other, wherein the boss is formed to extend passing through the opening of said mounting tab.

According to the magnetic tape cartridge thus comprised, even though the leader pin has the end collars made thin, the leader pin retaining structure reliably brings the tail end portions of the resilient arms of the retainer member into safe and secure press contact with the end collars of the leader pin, thereby securely retaining the leader pin in place when the magnetic tape cartridge is in no use. Since the leader pin is firmly held in the leader pin socket means with each end collar situated between the socket means and the bracket, the leader pin is prevented from tilting in or slipping out of the leader pin socket means even when the cartridge case is possibly distorted around the tape egress/ingress opening by an external impact load due to a drop of the magnetic tape cartridge in such a way that the cartridge case is broken open or splits into the individual case halves.

According to the magnetic tape cartridge having the leader pin retaining structure equipped with the mounting means, the retainer member is fixedly situated in predetermined vertical and transverse positions in the cartridge case, so as thereby to place the tail end portions of the resilient arms of the retainer member in place within the leader pin sockets, respectively. This secured placement is contributive to safe and secure press contact of the tail end portions of the resilient arms with the end collars of the leader pin. Further, the leader pin retaining structure provides installation facility of the retainer member into the cartridge case. In the case where the upper and lower case halves are fixedly connected to each other by ultrasonic welding, the mounting means provides facility of ultrasonic welding of the upper and lower case halves.

BRIEF DESCRIPTION OF THE DRAWINGS

The foregoing and other objects and features of the present invention will be clearly understood from the following detailed description when reading with reference to the accompanying drawing wherein same and similar parts are denoted by the same reference numerals throughout the drawings and in which:

FIG. 6 illustrates, in diagonally perspective overhead view, the leader pin retaining structure of the lower case half of the magnetic tape cartridge;

FIG. 23 illustrates, in perspective overhead view, the leader pin retaining structure equipped with mounting means in which still another alternative coupling means is incorporated;

FIG. 24 illustrates, in perspective overhead view, the leader pin retaining structure equipped with mounting means in which further alternative coupling means is incorporated.

DESCRIPTION OF THE PREFERRED EMBODIMENTS

In the following description, an arrow A denotes a direction in which a magnetic tape cartridge is inserted into a tape drive, a front side first. An arrow B, perpendicular to the arrow A, denotes a right hand or right side, and an arrow C, perpendicular to both arrows A and VB denotes an upper side. It should be understood that that the directional terminology, such as "upper", "lower", "inner", "outer", "top", "bottom", etc. are used for purposes of illustration only, and are in no way limiting.

Figure 1:
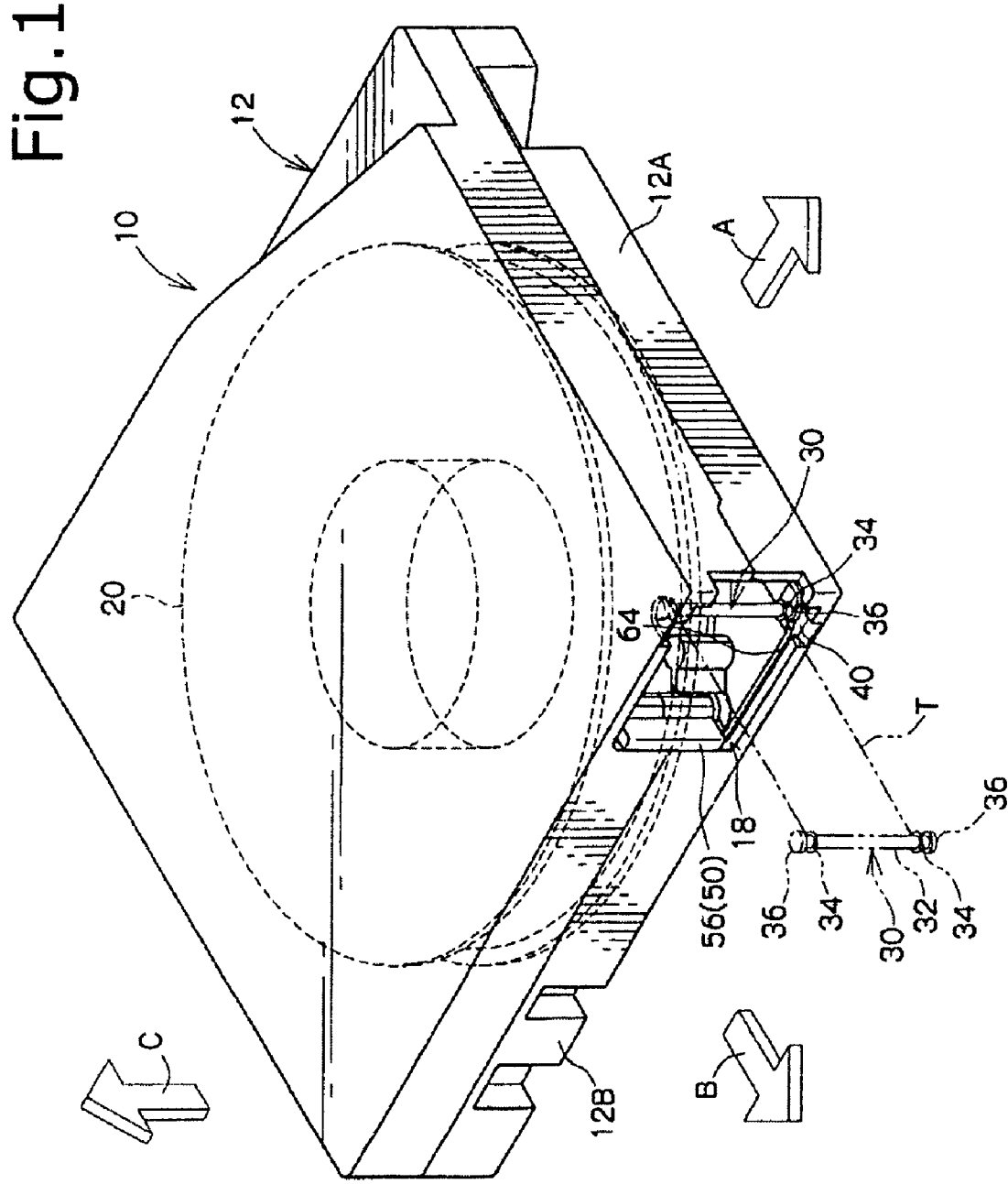
FIG. 1 illustrates, in perspective view, a magnetic tape cartridge according to an embodiment of the present invention.
Figure 2:
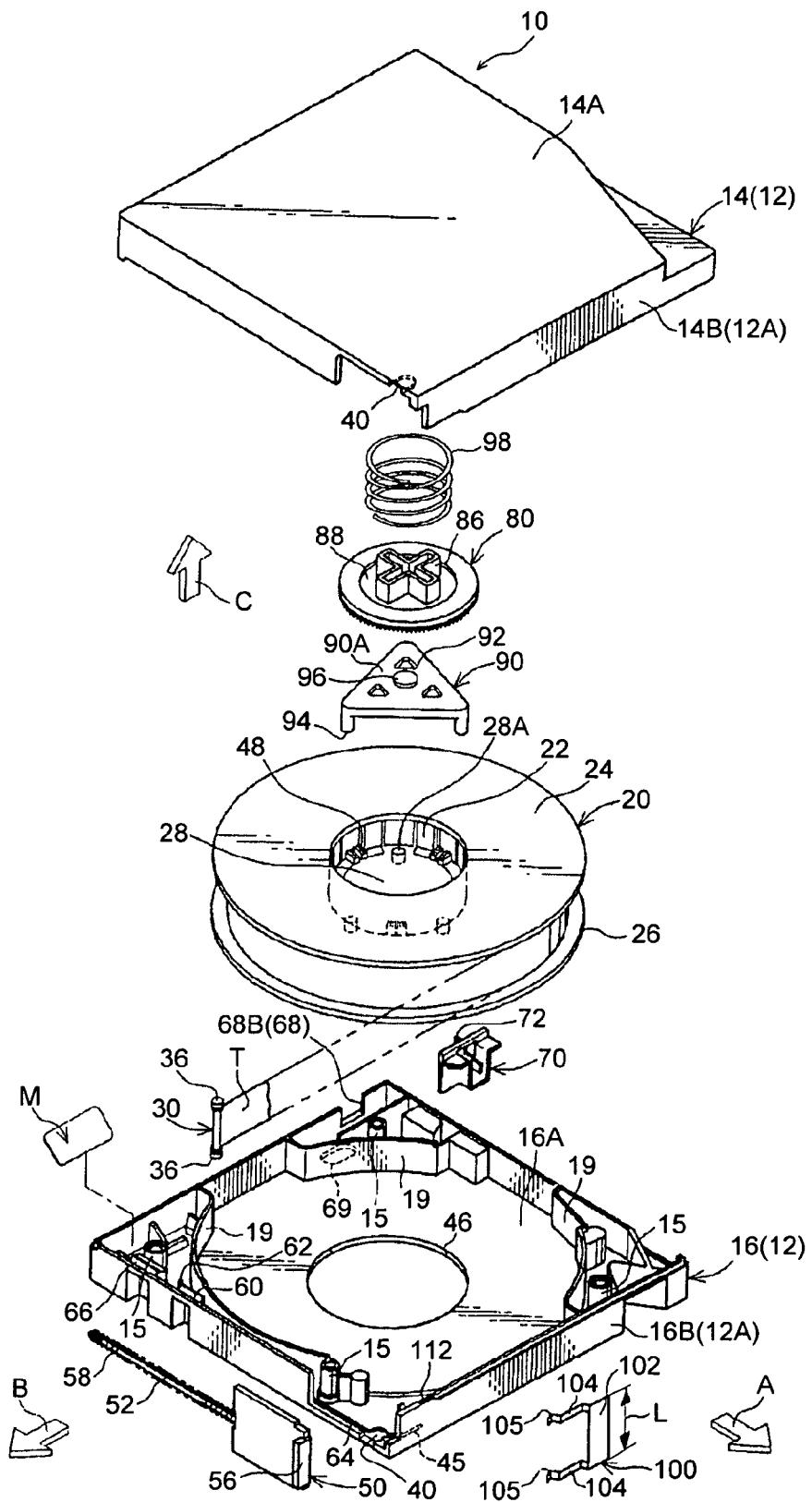
FIG. 2 illustrates, in exploded perspective overhead view, the magnetic tape cartridge.
Figure 3:
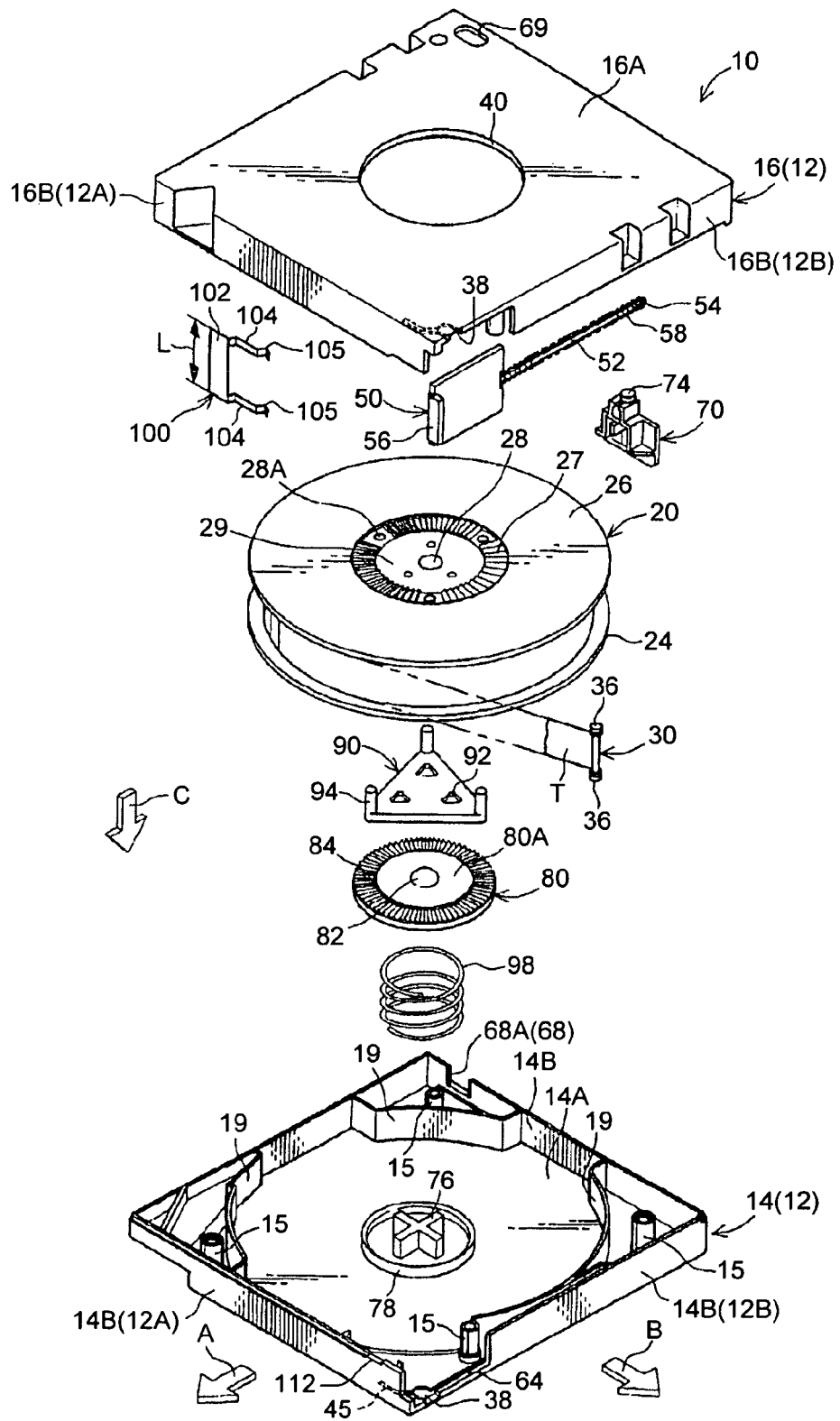
FIG. 3 illustrates, in exploded perspective overhead view, the magnetic tape cartridge turned upside down.

Referring to the drawings in detail and, more particularly, to FIGS. 1 to 3 illustrating a single reel magnetic tape cartridge (which is hereinafter referred to as a magnetic tape cartridge for simplicity) 10 according to a first embodiment of the present invention which contains a single tape reel assembly 20 rotatably therein, the magnetic tape cartridge 10 comprises a rectangular box-shaped cartridge case 12 having a peripheral wall 12A made up of two mating case halves, namely an upper case half 14 having a top plate 14A and a peripheral wall 14B and a lower case half 16 having a bottom plate 16A and a peripheral wall 16B. These upper and lower case halves 14 and 16 are fixedly connected to each other by set screws, or otherwise by joining their peripheral walls 14B and 16B abutted against each other, e.g. by ultrasonic welding. Specifically, the upper and lower case halves 14 and 16 have the same number of bosses a plurality of threaded bosses 15 extending near respective corners and are joined by fastening set screws (not shown) into the threaded bosses 15 through the bottom plate 16A. The cartridge case 12 is provided with a tape egress/ingress opening 18 formed in a generally rectangular shape in a right side wall 12B through which an associate tape drive accesses the magnetic recording tape contained therein and tape movement into and out of the cartridge interior is permitted.

As shown in FIGS. 2 and 3, the tape reel assembly 20, which is rotatable within the cartridge case 12 in opposite tape unwinding and tape winding directions to unwind a magnetic recording tape T and to wind the magnetic recording tape T, comprises a reel hub 22 as a cylindrical reel core having a cylindrical bore closed by a bottom 28 and a lower flange 26 which are formed as an integral mold, and a lower flange 26 fixedly connected to the reel hub 22 by ultrasonic welding. The reel hub 22 has, at its outside surface of the bottom wall 28, a plurality of, e.g. three in this embodiment, segment face gears 27 separated by regular spaces where through bores 28A are formed and, at its inside surface of the bottom wall 28, a plurality of, e.g. three in this embodiment, segment face gears 48 located correspondingly in circumferential position to the segment face gears 27. The segment face gears 27 are exposed to the exterior of the magnetic cartridge case 10 through a center opening 46 formed in the lower case half 16 so as to engage with a geared drive spindle (not shown) of an associated tape drive and rotated in the magnetic tape cartridge 10 by the geared drive spindle of the associated tape drive.

The magnetic recording tape T is wound around the reel hub 22 and retained between the upper and lower flanges 24 and 26. The tape reel assembly 20 is provided with a magnetic metal disc 29 which is coaxially, fixedly inserted in the bottom wall 28 encircled by within the segment face gears 27. The magnetic metal disc 29 is brought into magnetic engagement with a magnetic metal ring formed on the top of the geared drive spindle of the associated tape drive so as to couple the segment face gears 27 to the geared drive spindle of the associated tape drive, thereby coupling the tape reel assembly 20 to the associated tape drive. In order to prevent the tape reel assembly 20 from undesirably jouncing within the cartridge case 12, the upper and lower case halves 14 and 16 are provided with generally circular-arcuate guard ribs 19 arranged at corners of the lower case half 16. The magnetic recording tape T has a free or leading end which extends through the tape egress/ingress opening 18 in the magnetic tape cartridge 10 to enable the associated tape drive to extract the recording tape T from the magnetic tape cartridge 10 by means of a leader pin 30 (which is described in detail later) attached to the leading end, directly or through a leader tape (not shown).

The reel hub 22 is provided with a release block 90, a brake disc 80 and a torsion coil spring 98 movably received in this order within the cylindrical bore closed by the bottomed 28. The release block 90, which is disposed between the bottom wall 28 and the brake disc 80, is shaped in a generally equilateral triangle and has a top center projection 96, a plurality of, e.g. three in this embodiment, legs 94 at individual corners thereof and a plurality of, e.g. three in this embodiment, cutouts 92. The top center projection 96 extends from the top surface 90A of the release block 90 and has a predetermined small height. The legs 94 are shaped so that they pass through and extend out from the through bores 28A by predetermined lengths. The release block 90 is shaped in a generally equilateral triangle so as not to cover up the segment face gears 48. The cutouts 92 are provided in order to saving weight of the release block 90. The brake disc 80, which is disposed between the release block 90 and the torsion coil spring 98, has an annular face gear 84 and a generally hemispherical center striker 82 at the back side surface 80A thereof and a guide shoe 86 having a cross-shaped bore on the foreside surface 88. The guide shoe 86 cooperates with a cross-shaped slider 76 (see FIG. 3) extending from the top plate 14A of the upper case halve 14 to form a sliding joint. The cross-shaped bore of the guide shoe 86 and the cross-shaped slider 76 are complimentarily configured so that the cross-shaped slider 76 is slidably received along its full length in the cross-shaped bore of the guide shoe 86 and allowed to slide in the cross-shaped bore. The torsion coil spring 98, which is disposed between the top plate 14A of the upper case halve 14 and the brake disc 80, regularly urges the brake disc 80 toward a lock position which the brake disk 80 brings the annular face gear 84 into engagement with the segment face gears 48 of the bottom wall 28 of the reel hub 22 so as thereby to prevent the tape reel assembly 20 from rotating with respect to the cartridge case 12. In this instance, it is preferred to use materials such as polyacetal for the brake disc 80 and polybutylene terephthalate for the release block 90.

The magnetic tape cartridge 10A is provided with a generally rectangular door 50 for opening and closing the tape egress/ingress opening 18. The door 50 is fitted in upper and lower guide grooves 64 formed in the top plate 14A and the bottom plate 16A, respectively, so as to slide inside and along the right side wall 12B. The door 50 has a rod 52 extending rearward and provided with a coil spring 58 mounted thereon and retained at its one end by a retaining member 62. The coil spring 58 is of a type always forcing the door 50 toward a closed position where the door 50 fully closes the tape egress/ingress opening 18. The retaining member 62 is provided one of rod carriers 60 and 66 projecting inside from the peripheral wall 16B of the lower case half 16 for supporting and guiding the rod 52 thereon for slide movement. The door 50 further has a bent leading edge 56 engageable with an opening and closing mechanism of an associated tape drive so that the door 50 is moved rearward against the coil spring 58 to open the tape egress/ingress opening 18 while the magnetic tape cartridge 10 is loaded into the associated tape drive and is moved back to close the tape egress/ingress opening 18 when the magnetic tape cartridge 10 is removed from the associated tape drive.

The magnetic tape cartridge 10 is further provided with a write-protect switch 70 having a tab 72 and a mode reference pointer 74. The write-protect switch 70 is located inside the cartridge case 12 so as to slide right and left between two positions, namely a write-mode position for enabling writing on the magnetic recording tape T and a write-protect mode position for prohibiting writing on the magnetic recording tape T. For the slide movement of the write-protect switch 70, the tab 72 is received in an rectangular opening 68 of the cartridge case 12 which is formed by two mating opening halves 68A and 68B provided in the peripheral wall 14B of the upper case half 14 and the peripheral wall 16B of the lower case half 16, respectively, so as to be manually operated from outside the cartridge case 12. The mode reference pointer 74 is received in a slot 69 formed in the same direction as the rectangular opening 68 in the bottom plate 16A of the lower case half 16 and lies beneath the outer surface of the bottom plate 16A of the lower case half 16 so as to change its position according to selected positions of the write-protect switch 70. Specifically, when the magnetic tape cartridge 10 is loaded into an into the associated tape drive, selected recording modes of the magnetic tape cartridge 10 is automatically judged by the associated tape drive according positions of the mode reference pointer 74 of the write-protect switch 70. As seen in FIG. 2, the magnetic tape cartridge 10 is provided with a memory chip M installed at a predetermined angle in a retaining section provided in the right rear corner thereof. The memory chip M is well known in the art and is generally a thin rectangular tip.

Figure 4:
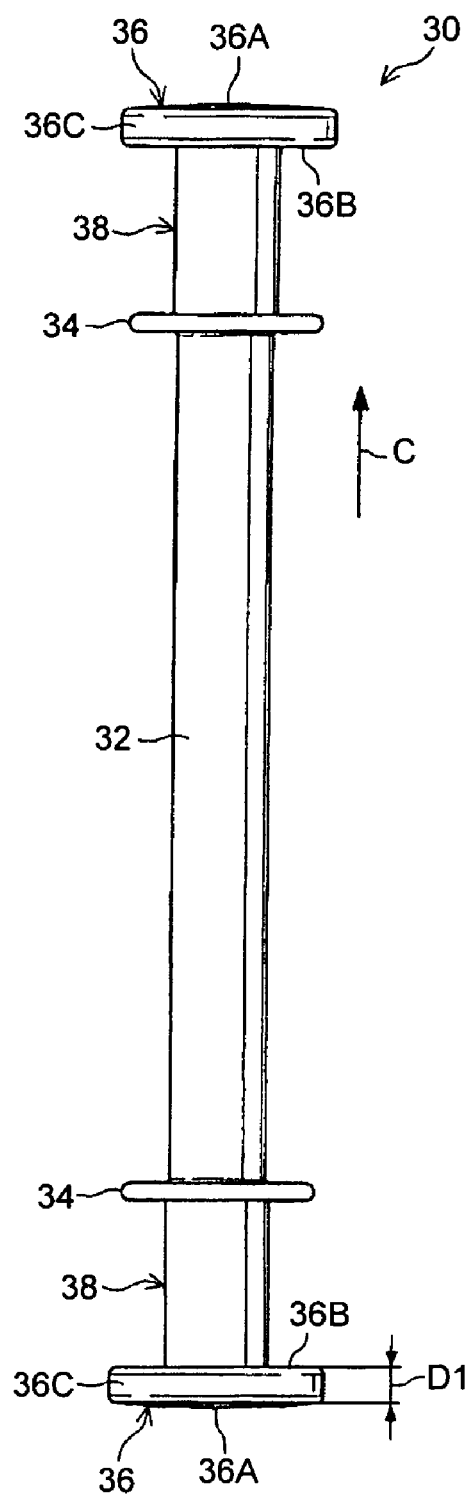
FIG. 4 illustrates, in side view, a leader pin incorporated in the magnetic tape cartridge.

Referring to FIG. 4, the leader pin 30 comprises a cylindrical rod 32 with circular end collars 36 formed at opposite ends and inside collars 34 at a distance approximately equal to the width of the magnetic recording tape T. The inside color 34 has a diameter greater than that of the cylindrical rod 32 but smaller than or comparable to that of the end collar 36 and a thickness less than that of the end collar 36. The individual end collar 36a has an outer wall 30A, a inner wall 30 and a side wall 30C. These rod 32 and collars 34 and 36 are preferably formed as an integral piece. This configuration provides the leader pin 30 with an annular space 38 between the collars 34 and 36a at each of the opposite ends for engagement with tape threading means (not shown) of the associated tape drive and protection of the magnetic recording tape T from getting scratched by the hook means during movement of the magnetic recording tape T out of the magnetic tape cartridge 10. The leader pin 30 is accommodated within the magnetic tape cartridge 10 when the magnetic tape cartridge 10 is not in use or unloaded from a tape drive. In order to accommodate the leader pin 30 within the cartridge case 12, there are provided top and bottom leader pin sockets for removably receiving opposite ends of the leader pin 30 in the cartridge case 12.

Figure 5:
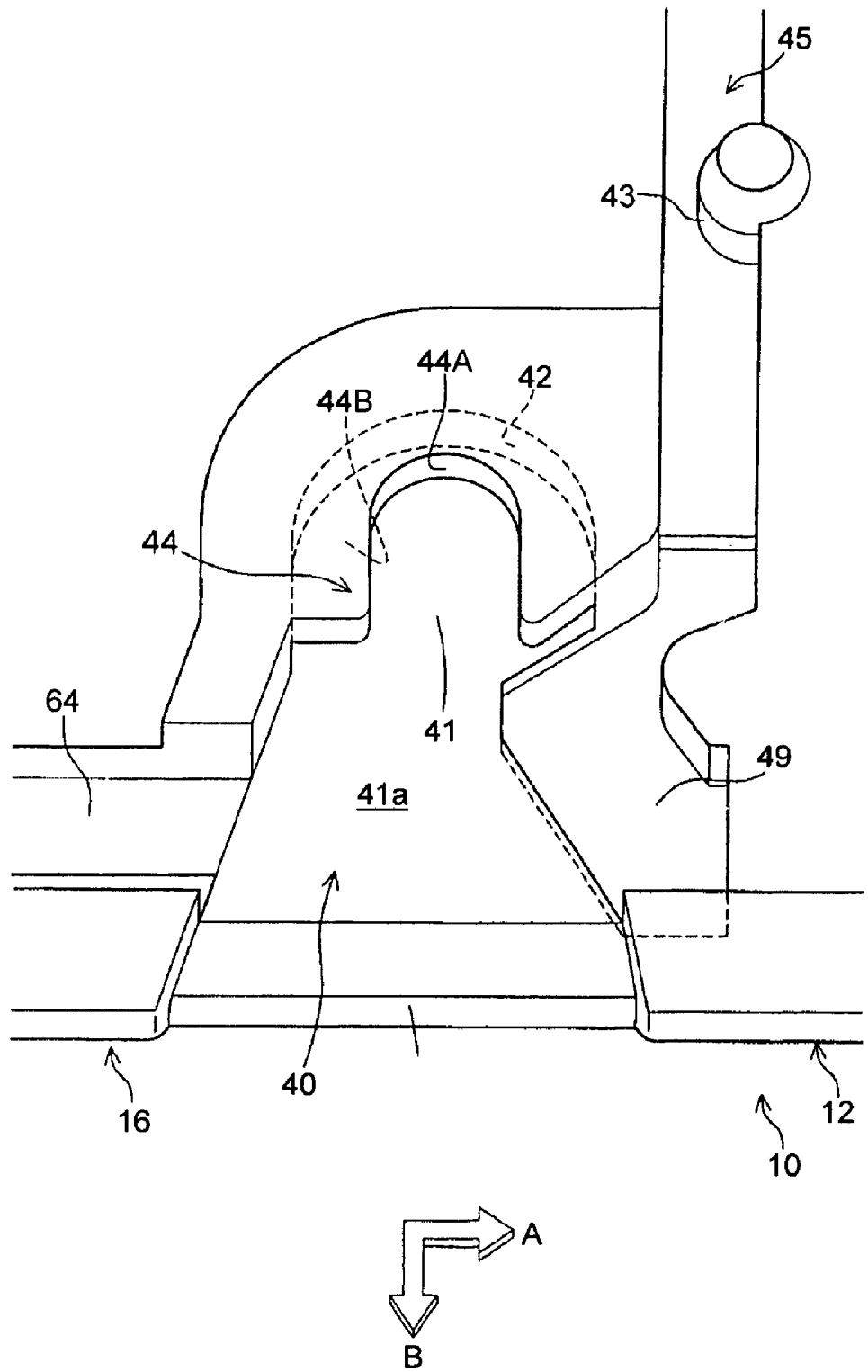
FIG. 5 illustrates, in perspective overhead view, a leader pin retaining structure of a lower case half of the magnetic tape cartridge.
Figure 7:
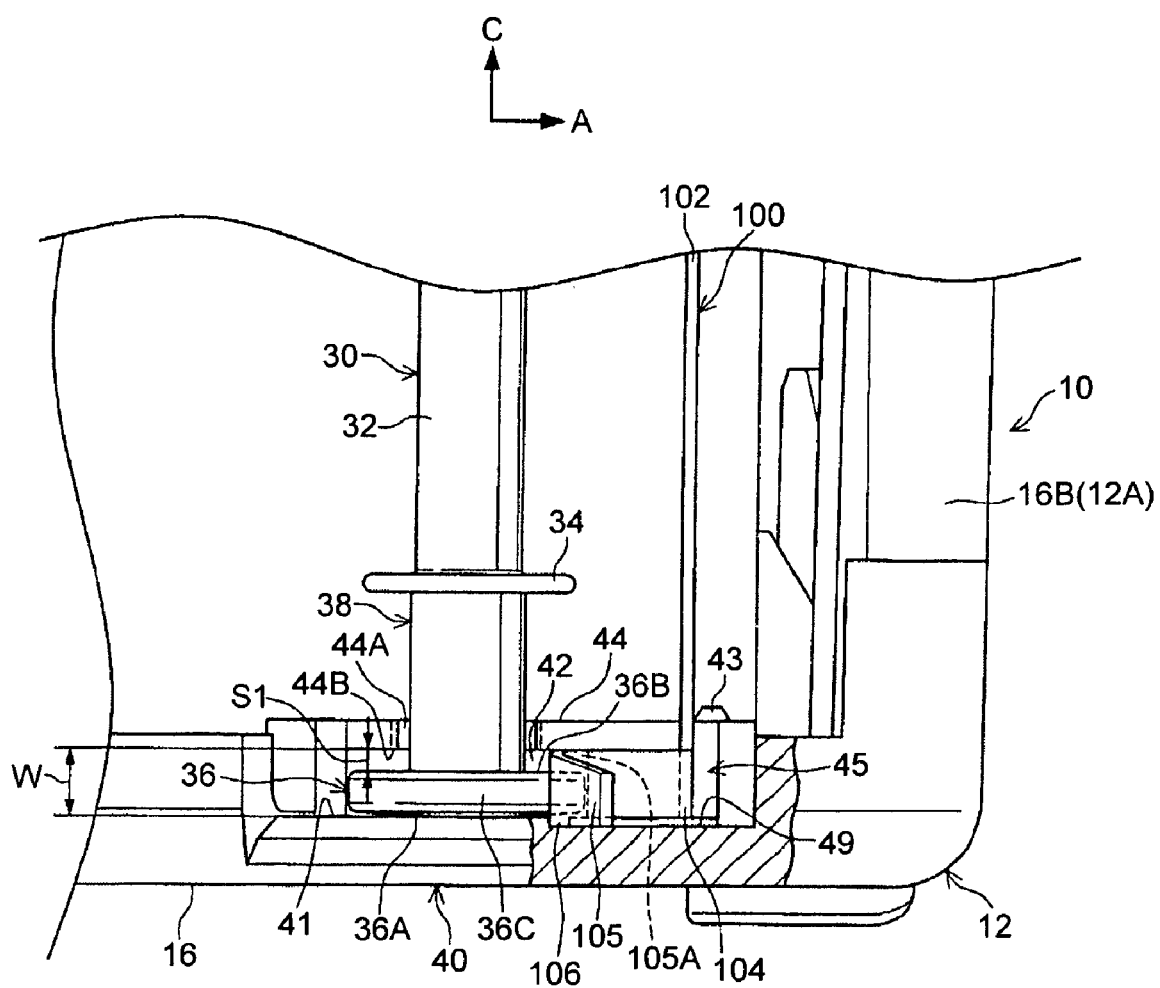
FIG. 7 illustrates, in detailed front view, the leader pin retaining structure of the lower case half of the magnetic tape cartridge.

Referring to FIGS. 5 to 7, the cartridge case 12 has a leader pin retaining structure including top and bottom leader pin sockets 40 in semicylindrical shape, exactly identical in structure with each other, which are provided in the upper and lower case halves 14 and 16, respectively (only the leader pin socket 40 formed in the bottom plate 16A of the lower case half 16 is shown). The individual leader pin socket 40 is provided immediately behind the tape egress/ingress opening 18 by a generally U-shaped recess 41 having a semi-circular end wall 42 similar in shape to the end collar 36 for snugly and removably receiving an supporting the end collar 36 of the leader pin 30 and a bracket 44 having a generally U-shaped opening 44A for snugly and removably receiving and supporting the cylindrical rod 32 of the leader pin 30 at the annular space 38 between the collars 34 and 36. In this instance, the bracket 44 may be provided in at least either one of the leader pin socket 40. The U-shaped recess 41, which includes a front apron 41a, is formed in the bottom plate 16A of the lower case half 16. The bracket 44, which may be formed as an integral part of, or otherwise as a separate piece fixedly attached to, the bottom plate 16A of the lower case half 16, is spaced apart from the bottom of the U-shaped recess 41 by a vertical distance W greater than a thickness D1 of the end collar 36 (see FIG. 4) so that a clearance S1 (se FIG. 7) is provided between the bracket 44 and the end collar 36 when the leader pin 30 is received in the leader pin sockets 40. The leader pin sockets 40 thus configured allow the end collar 36 of the leader pin 30 to pop into without brushing against the bracket 44 and keep the leader pin 30 upright with respect to each of the top and bottom plates 14A and 16A of the upper and lower case halves 14 and 16. The leader pin 30 is retained within the leader pin sockets 40 by leader pin retaining means including a retainer member 100 such as shown in FIG. 8 when the magnetic tape cartridge 10 is not in use or unloaded from a tape drive.

In order to fixedly mount the retainer member 100 within the cartridge case 12, there are provided with leader pin retaining means comprises a pair of retaining groove 45, identical in shape with each other, formed in the top and bottom plates 14A and 16A of the upper and lower case halves 14 and 16, respectively. Each retaining groove 45, which is made wide sufficiently enough to allow the retainer member 100 to bend therein, extends along the peripheral wall of the case half and is adapted for reception of a lateral margin of the retainer member 100 and provided with a sleeve strut 43 therein. Further, there is a recessed apron 49 cut into each of the top and bottom plates 14A and 16A of the upper and lower case halves 14 and 16 and located between the leader pin socket 40 and the retaining groove 45. The recessed apron 49, which partly extends into a pathway of the leader pin 30 to the leader pin socket 40, is adapted to permit movement of a tail end portion of the retainer member 100 and cut deeply enough to prevent the tail end portion of the retainer member 100 from rubbing the bottom thereof.

Figure 8:
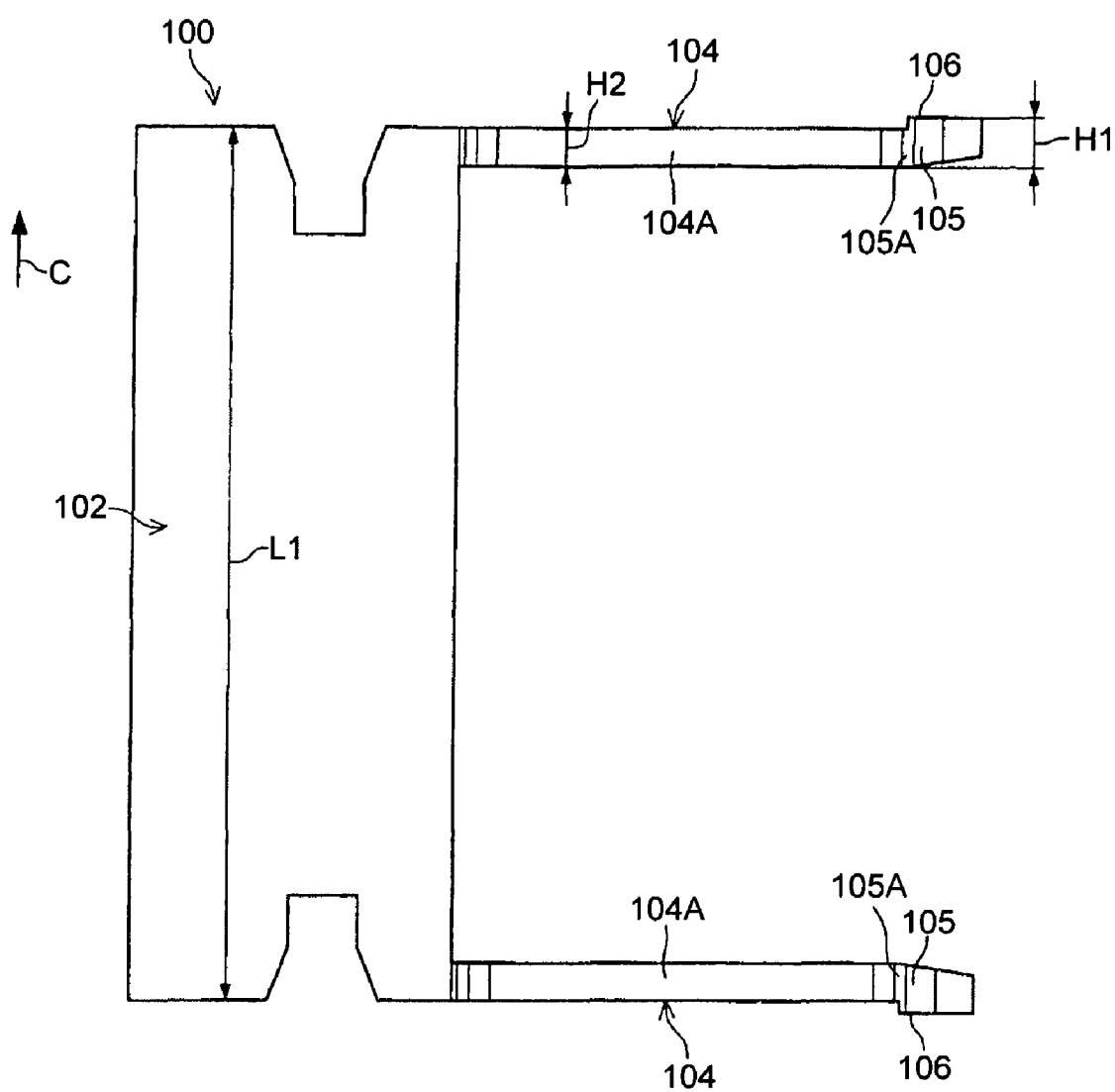
FIG. 8 illustrates, in plan view, a retainer member incorporated in the leader pin retaining structure.

Referring to FIG. 8 showing the retainer member 100 in detail, the retainer member 100 is provided in the form of a bifurcated resilient claw member and is preferably made as a single integral piece of bifurcated leaf spring from a nonmagnetic metal sheet such as SUS. The retainer member 100 comprises a relatively rigid flat base portion 102 and a pair of resilient arms 104 separated in a width direction of the flat base portion 102 and extending in a direction perpendicular to the width direction from the flat base portion 102. The flat base portion 102 has a width L1 approximately equal to a distance between bottoms of the retaining grooves 45 of the top and bottom plates 14A and 16A of the upper and lower case halves 14 and 16. The resilient arms 104, identical in shape with each other, extend in a direction perpendicular to the width direction of the flat base portion 102 from each of the opposite sides of the flat base portion 102. Each resilient arm 104 has a main body portion 104A of a width H2 approximately equal to a depth of the retaining groove 45 and a generally V-shaped end portion 105 of a maximum width of H1 (H1>H2) at its tail end. The V-shaped end portion 105 is tapered laterally inward and expanded laterally outward from the outer edge of the main body portion 104A as an outer straight rim 106. The retainer member 100 is fixedly installed in the retaining groove 45 in the top and bottom plate 14A of the upper and lower case halves 14 and 16.

Referring back to FIGS. 6 and 7, the retainer member 100 is installed in the cartridge case 12 by inserting the opposite lateral margins of the retainer member 100 in the retaining grooves 45. More specifically, the retainer member 100 is installed so that the main body portion 104A of the resilient arm 104 is approximately fully received within the retaining groove 45 and resiliently urged and bent by the sleeve strut 43 so as thereby to place the V-shaped end portion 105 of the resilient arm 104 on the pathway of the leader pin 30 within the recessed apron 49. In this state, the resilient arm 104 is always charged with resilience acting toward the leader pin sockets 40, the leader pin 30 in the leader pin sockets 40 is safely and securely retained in position.

In operation of the magnetic tape cartridge 10 with the leader pin retaining structure, in a state where the magnetic tape cartridge 10 is in no use (e.g. during shipping or storage) or unloaded from a tape drive, the tape egress/ingress opening 18 is closed by the door 50. Inside the tape egress/ingress opening 18, the leader pin 30 is situated in the leader pin sockets 40 in such a way that the end collars 36 are received in the U-shaped recess 41, respectively, and the cylindrical rod 32 is received in the U-shaped openings 44A of the brackets 44 at the annular spaces 38, respectively. Further, the retainer members 100 press the side walls 36C of the end collars 36 of the leader pin 30 against the semi-circular end walls 42 of the leader pin sockets 48 at the V-shaped end portions 105 of the resilient arms 104, respectively, so that the leader pin 30 is safely and securely enclasped within the leader pin sockets 40 and kept upright with respect to the top and bottom plates 14A and 16A of the cartridge case 12. In this state, the brake disc 80, which maintains partial slide engagement of the cross-shaped slider 76 in the cross-shaped bore thereof, is urged to the lock position where the annular face gear 84 engages with the segment face gears 48 of the bottom wall 28 of the reel hub 22. Therefore, the tape reel assembly 20 is prevented from rotating with respect to the cartridge case 12.

When the magnetic tape cartridge 10 is loaded into a tape drive in the forward direction A, the front side first, a door opening/closing head (not shown) of the associated tape drive catches the bent leading edge 56 of the door 50 and forces it rearward against the coil spring 58 following movement of the magnetic tape cartridge 10 into the associated tape drive. When the magnetic tape cartridge 10 is fully inserted in position, the door 50 fully opens the tape egress/ingress opening 18. At this time, the magnetic tape cartridge 10 is automatically moved down until a positioning pin (not shown) of the associated tape drive engages a positioning hole (not shown) of the cartridge case 12. Concurrently, the geared drive spindle of the associated tape drive has access to the tape reel assembly 20 through the center opening 46 of the cartridge case 12. Then, the geared drive spindle of the associated tape drive brings its gear into engagement with the segment face gears 27 of the reel hub 22 while pushing the legs 94 of the release block 90 upward against the coil spring 98 through slide movement of the cross-shaped slider 76 in the cross-shaped bore of the guide shoe 86. Then, the release block 90 pushes the brake disc 80 upward through contact between the top center projection 96 and the magnetic metal disc 29, thereby releasing the brake disc 80 from the tape reel assembly 20 through disengagement of the annular face gear 84 from the segment face gears 48 of the bottom wall 28 of the reel hub 22. In this state, the magnetic metal disc 29 of the reel hub 22 is magnetically attracted and held by the magnetic metal ring of the geared drive spindle of the associated tape drive, so that the tape reel assembly 20 is enabled to rotate relatively to the cartridge case 12 while remaining operationally united together with the geared drive spindle.

On the other hand, the tape threading means of the associate tape drive accesses the leader pin 30 of the magnetic recording tape T received and retained in position in the leader pin sockets 40 of the magnetic tape cartridge 10 through the tape egress/ingress opening 18 and catches the leader pin 30 prior to unwinding the magnetic recording tape T off tape reel assembly 20, i.e. the tape reel hub 22. In this instance, since the magnetic tape cartridge 10 is accurately positioned in the associated tape drive, the tape threading means is brought into accurate engagement with the leader pin 30 at the annular spaces 35. Then, the tape threading means of the associate tape drive extracts the leader pin 30 from the leader pin sockets 40. During this extraction, the leader pin 30 pushes aside the V-shaped end portions 105 of the resilient arms 104 of the retainer member 100 at the end collars 36, thereby charging the resilient arms 104 with resilience while bending them. When the leader pin 30 is fully extracted from the leader pin sockets 40, the V-shaped end portions 105 of the resilient arms 104 of the retainer member 100 bends backward by the charged resilience. At this time, the tape reel assembly 20, which has been operationally released from the brake disc 80, rotates following extraction of the leader pin 30 from the magnetic tape cartridge 10. After the tape threading means brings the leader pin 30 into engagement with a take-up reel of the associated tape drive, the magnetic recording tape T is forwarded and unwound off the tape reel assembly 20 and wound onto the take-up reel synchronized in rotation with the tape reel assembly 20. Thus, a read/write head reads or writes data from or to the magnetic recording tape T.

When ejecting the magnetic tape cartridge 10 from the associated tape drive after reading or writing data from or to the magnetic recording tape T, the geared drive spindle is driven in the reverse or tape rewinding direction. When the magnetic recording tape T is fully rewound onto the tape reel hub 22 of tape reel assembly 20, the leader pin 30a is pulled and received into the leader pin sockets 40 of the magnetic tape cartridge 10. During this reception, the leader pin 30 pushes aside the V-shaped end portions 105 of the resilient arms 104 of the retainer member 100 at the end collars 36 and charge the resilient arms 104 with resiliency while bending them. When fully received in the leader pin sockets 40, the leader pin 30 is shoved at the end collars 36 by the V-shaped end portions 105 of the resilient arms 104, so as thereby to be retained in position within the leader pin sockets 40.

Thereafter, the magnetic tape cartridge 10 is lifted up and, when the positioning pin of the associated tape drive is disengaged from the positioning hole of the cartridge case 12, the geared drive spindle comes out of the cartridge case 12 through the center opening 46 and brings its gear into disengagement from the segment face gears 27 of the reel hub 22. Consequently, the brake disc 80 and the release block 90 are forced downward by the coil spring 98 to let the legs 94 of the release block 90 crawl into and partly project out through the bores 28A of the bottom wall 28 of the reel hub 22 of the tape reel assembly 20, thereby causing engagement between the annular face gear 84 of the brake disc 80 and the segment face gears 48 of the bottom wall 28 of the reel hub 22 of the tape reel assembly 20. Herewith, the tape reel assembly 20 is prevented from rotation relative to the cartridge case 12. In this state, the magnetic tape cartridge 10 is moved backward in a direction opposite to the forward direction A by an ejection mechanism of the associated tape drive. During this ejective movement of the magnetic tape cartridge 10, the door 50 is forced to slide by the coil spring 58, thereby closing the tape egress/ingress opening 18. The magnetic tape cartridge 10 with the tape reel assembly 20 thus locked in rotation and the tape egress/ingress opening 18 closed by the door 50 is entirely ejected out of the associated tape drive.

As described above, since the leader pin 30 is firmly held in the leader pin sockets 40 with each end collar 36 situated between the U-shaped recess 41 and the bracket 44, even when the cartridge case 12 is possibly distorted around the tape egress/ingress opening 18 by an external impact load due to a drop of the magnetic tape cartridge 10 in such a way that the cartridge case 12 is broken open or splits into the individual case halves 14 and 16 around the egress/ingress opening 18, the cartridge case 12 is prevented from causing distortion or deformation of the cartridge case 12 at the tape egress/ingress opening 18 by the leader pin 30. More specifically, if the magnetic tape cartridge 10 causes such distortion or deformation as braking open the cartridge case 12 around the tape egress/ingress opening 18, the bracket 44 is brought into press contact with the end collar 36 of the leader pin 30 at the inner wall 36B, the cartridge case 12 is prevented from being broken open by the leader pin 30 prevents. Concurrently, since the end collar 36 of the leader pin 30 is held down by the bracket 44, the leader pin 30 is prevented from dropping off from the leader pin socket 40. Furthermore, when the magnetic tape cartridge 10 is not in use or unloaded from a tape drive, the leader pin socket 40 holds the leader pin 30 by supporting the cylindrical rod 32 at the annular space 38 between the collars 34 and 36 by the U-shaped opening 44A of the bracket 44 overlapping the end collars 36, so that the leader pin 30 is prevented from accidentally tilting within the leader pin socket 40 along with prevented from off from the leader pin socket 40.

The V-shaped end portion 105 having the outer straight rim 178 moves within the recessed apron 49 between the leader pin socket 40 and the retaining groove 45, so that, even though the end collar 36 of the leader pin 30 is made sufficiently thin enough to be inserted between the U-shaped recess 41 and the bracket 44 of the leader pin socket 40, the leader pin 30 is shoved at the end collar 36 by the V-shaped end portion 105 of the resilient arm 104 increased in contact area by the outer straight rim 178.

Figure 9:
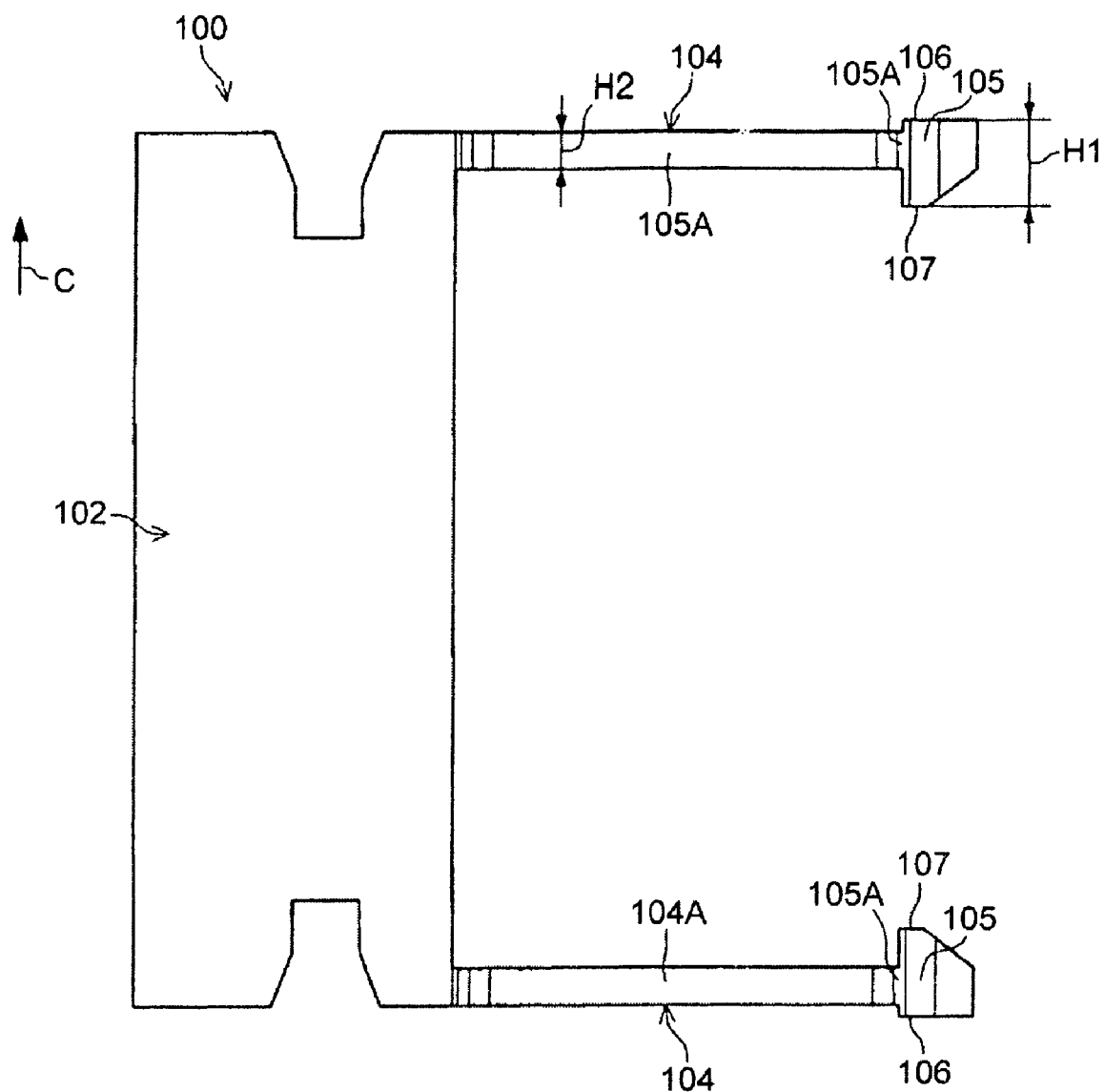
FIG. 9 illustrates, in detailed front view, the leader pin retaining structure of a lower case half of the magnetic tape cartridge.
Figure 10:
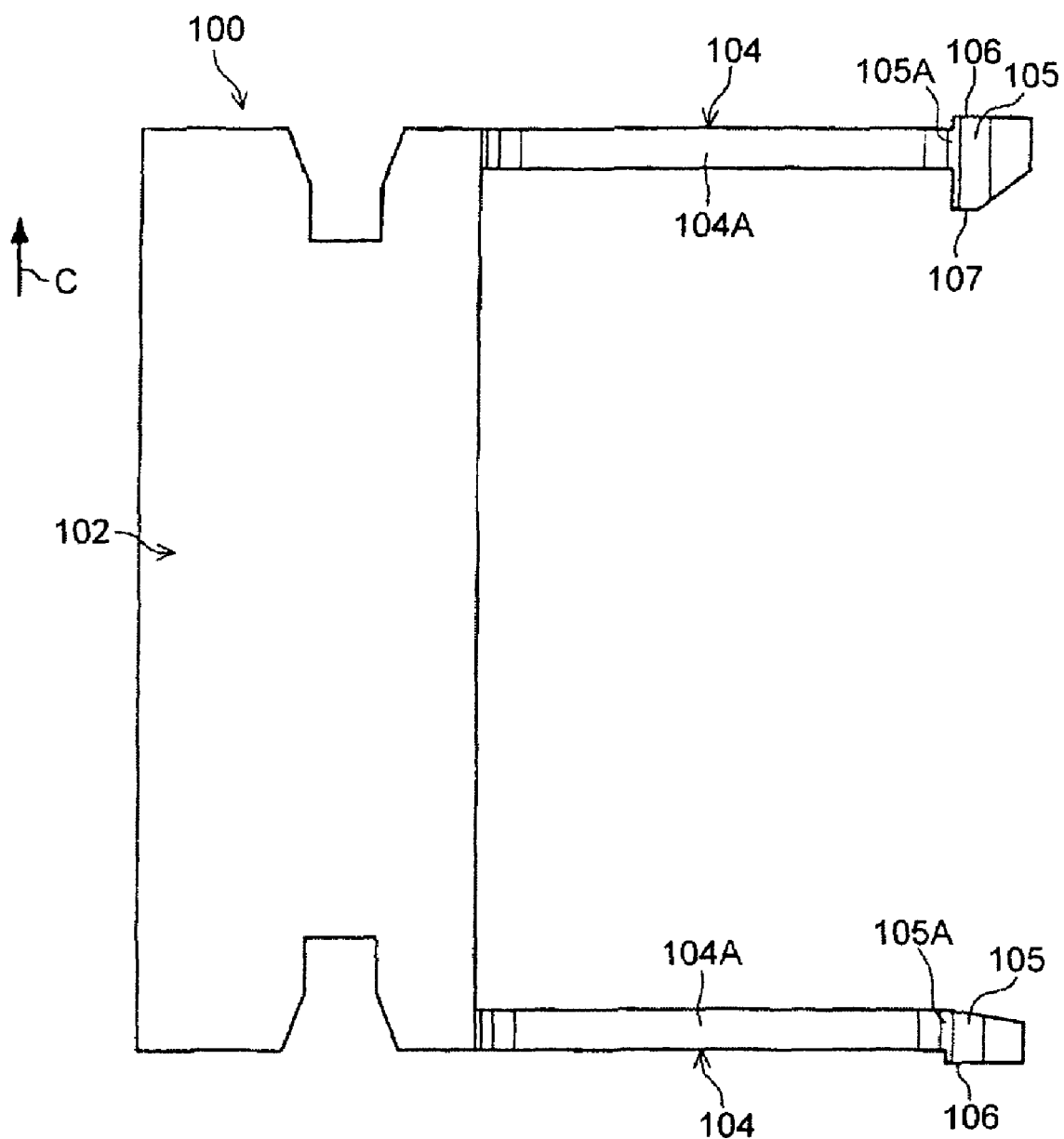
FIG. 10 illustrates, in plan view, another alternative retainer member.

Referring to FIGS. 9 and 10 showing alternates variants of the retainer member 100 shown in FIG. 8, the alternative retainer members are adapted for a leader pin 30 (see FIGS. 11 and 12) which is basically identical with the leader pin 30 shown in FIG. 4 except that the leader pin 30 is slightly shorter in overall length than the distance between the leader pin sockets 40. Each variant retainer member is basically identical in structure and operation with the retainer member 100 except that V-shaped end portions 105 are different only in shape from those of the retainer member 100. As shown in FIG. 9, a variant retainer member 100 has V-shaped end portions 105. Each V-shaped end portions 105 is expanded laterally outward and inward from the opposite edges of the main body portion 104A as an outer straight rim 106 and an inner tapered rim 107, respectively. Otherwise, as shown in FIG. 10, a variant retainer member 100 has V-shaped end portions 105. Either one of V-shaped end portions 105, preferably the V-shaped end portion 105 associated with the upper case half 14, is expanded laterally outward and inward from the opposite edges of the main body portion 104A as an outer straight rim 106 and an inner tapered rim 107, respectively. The other V-shaped end portion 105 is expanded only laterally outward from the opposite edge of the main body portion 104A as an outer straight rim 106.

Figure 11:
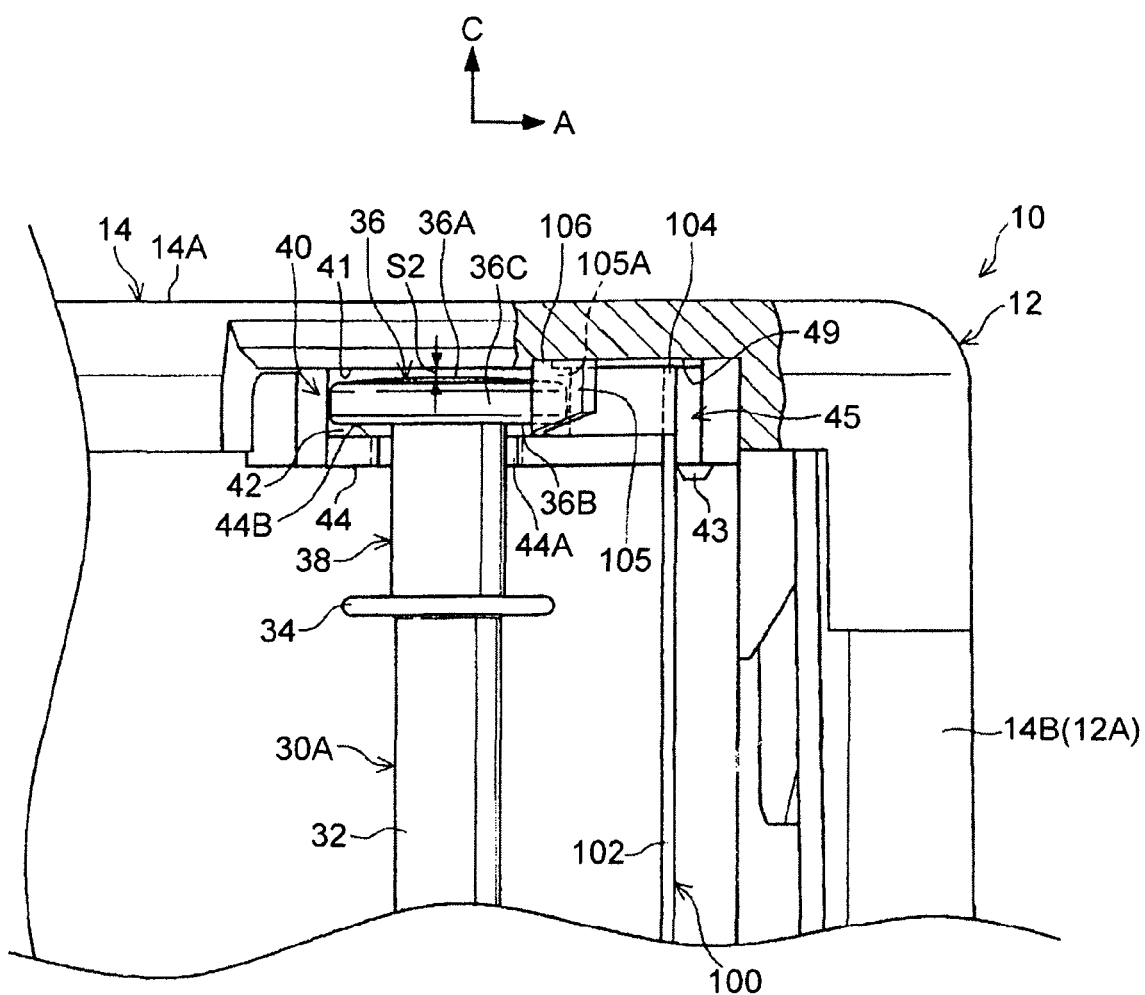
FIG. 11 illustrates, in detailed front view, the leader pin retaining structure of an upper case half of the magnetic tape cartridge in which the retainer member shown in FIG. 8 is incorporated.

FIG. 11 illustrates a leader pin retaining structure including the retainer member 100 shown in FIG. 8 in detail which is incorporated in the magnetic tape cartridge 10 having the leader pin 30A. As described above, the leader pin 30A is slightly shorter in overall length than the distance between the leader pin sockets 40. The magnetic tape cartridge 10 is provided a clearance S2 (S2>S1) between bottom of the leader pin socket 40 and the top end 36A of the leader pin 30A However, the V-shaped end portion 105 provided with at least the outer straight rim 106 of the retainer member 100 has a certainly increased surface area for contact with the side wall 36C of the end collar 36.

Figure 12:
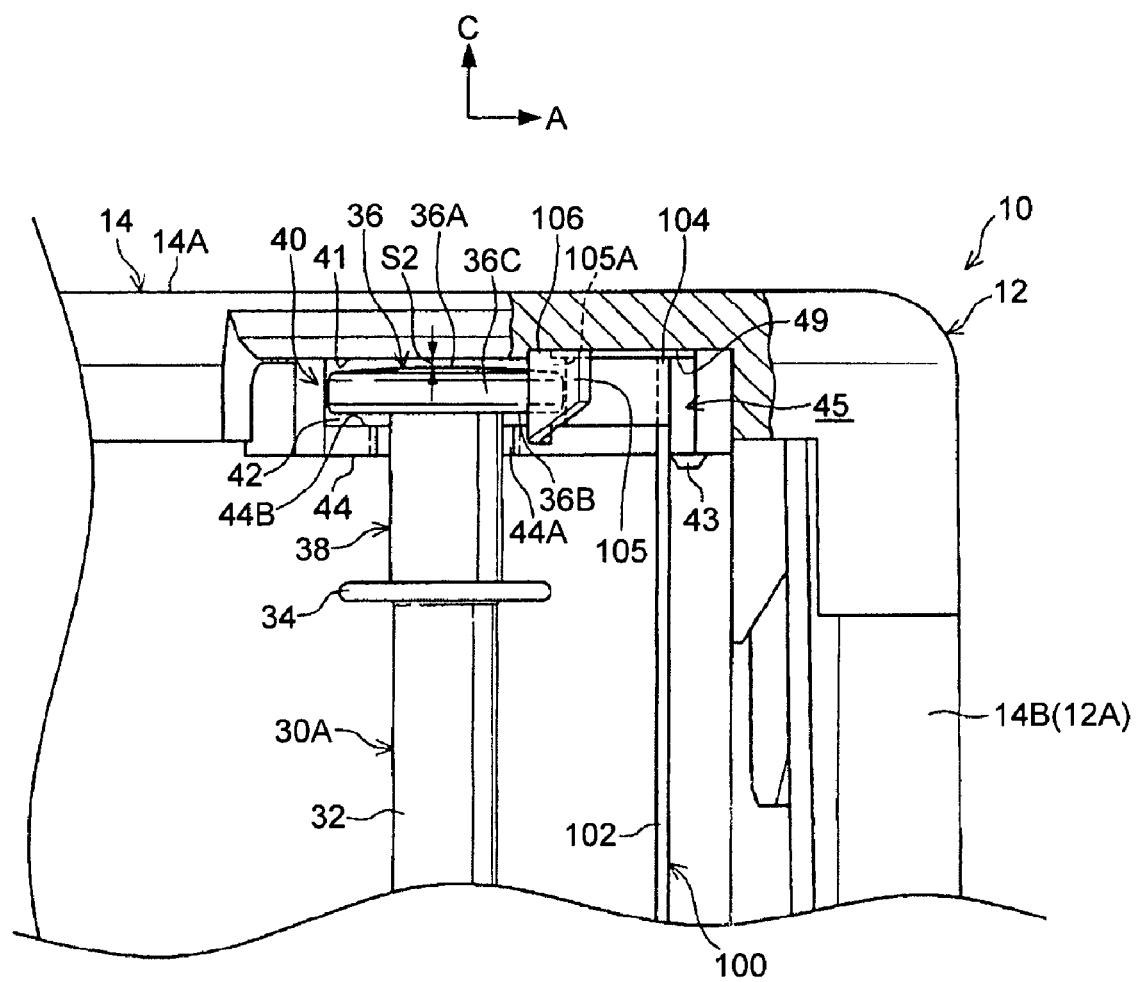
FIG. 12 illustrates, in detailed front view, the leader pin retaining structure of an upper case half of the magnetic tape cartridge in which the retainer member shown in FIG. 9 or 10 is incorporated.

FIG. 12 illustrates a leader pin retaining structure including the retainer member 100 shown in FIG. 9 or 10 in detail which is incorporated in the magnetic tape cartridge 10 having the leader pin 30A slightly shorter in overall length than the distance between the leader pin sockets 40. Since the V-shaped end portion 105 provided with the inner tapered rim 107 along with the outer straight rim 106 of the retainer member 100 has a far more increased surface area for contact with the side wall 36C of the end collar 36, it is ensured to bring the V-shaped end portion 105 of the retainer member 100 into safe and secure press contact with the end collars 36 of the leading pin 30.

According to the leader pin retaining structure including the variant retainer member 100 shown in FIG. 11 or 12, the V-shaped end portions 105 press against the end collars 36 of the leading pin 30A, respectively, by approximately equal pressure, so as to realize stable retention of the leader pin 30A within the leader pin sockets 40, thereby preventing the leader pin 30A from dropping off from the leader pin sockets 40.

Figure 13:
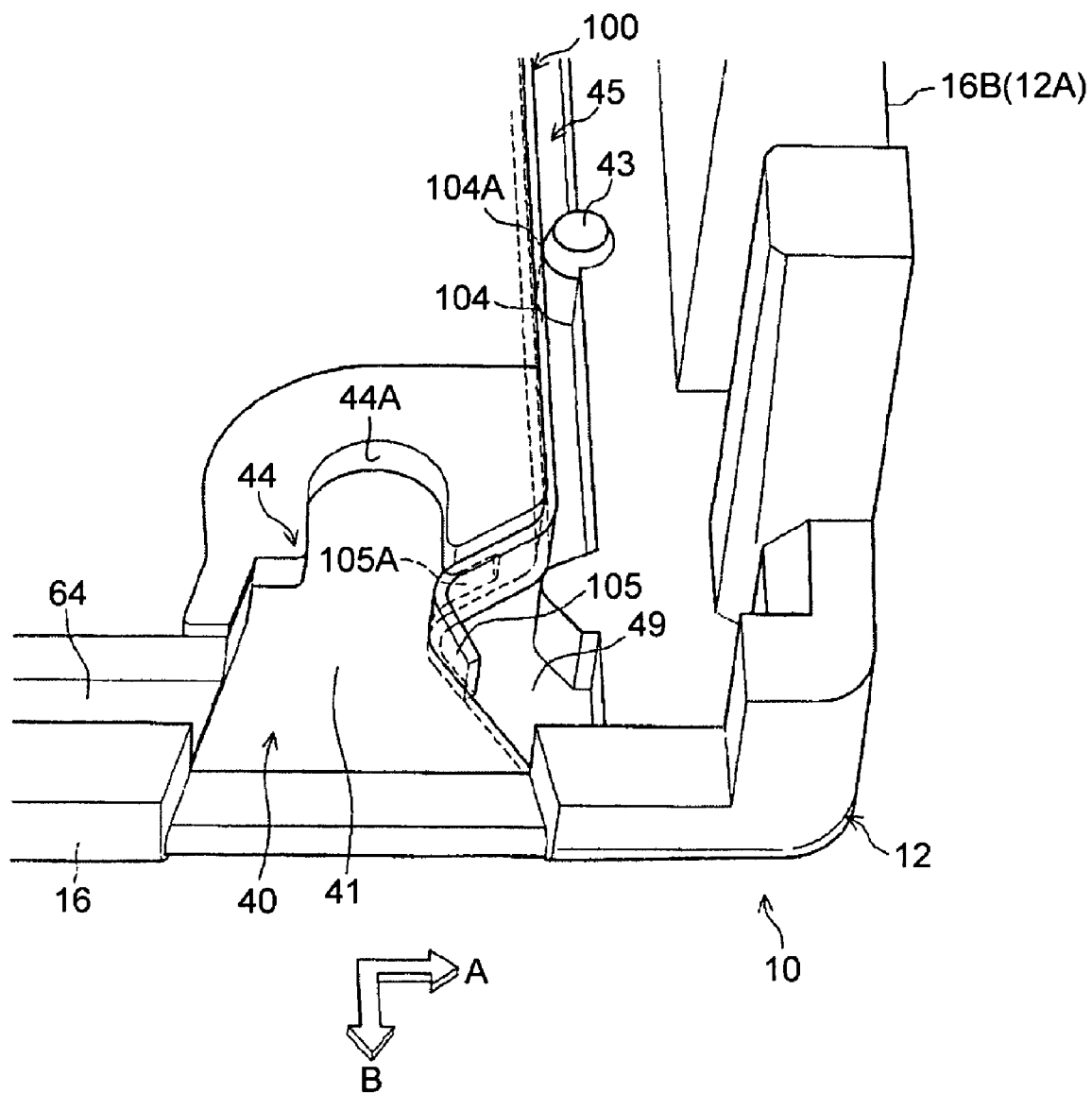
FIG. 13 illustrates, in perspective overhead view, an alternative leader pin retaining structure of a lower case half of the magnetic tape cartridge.
Figure 14:
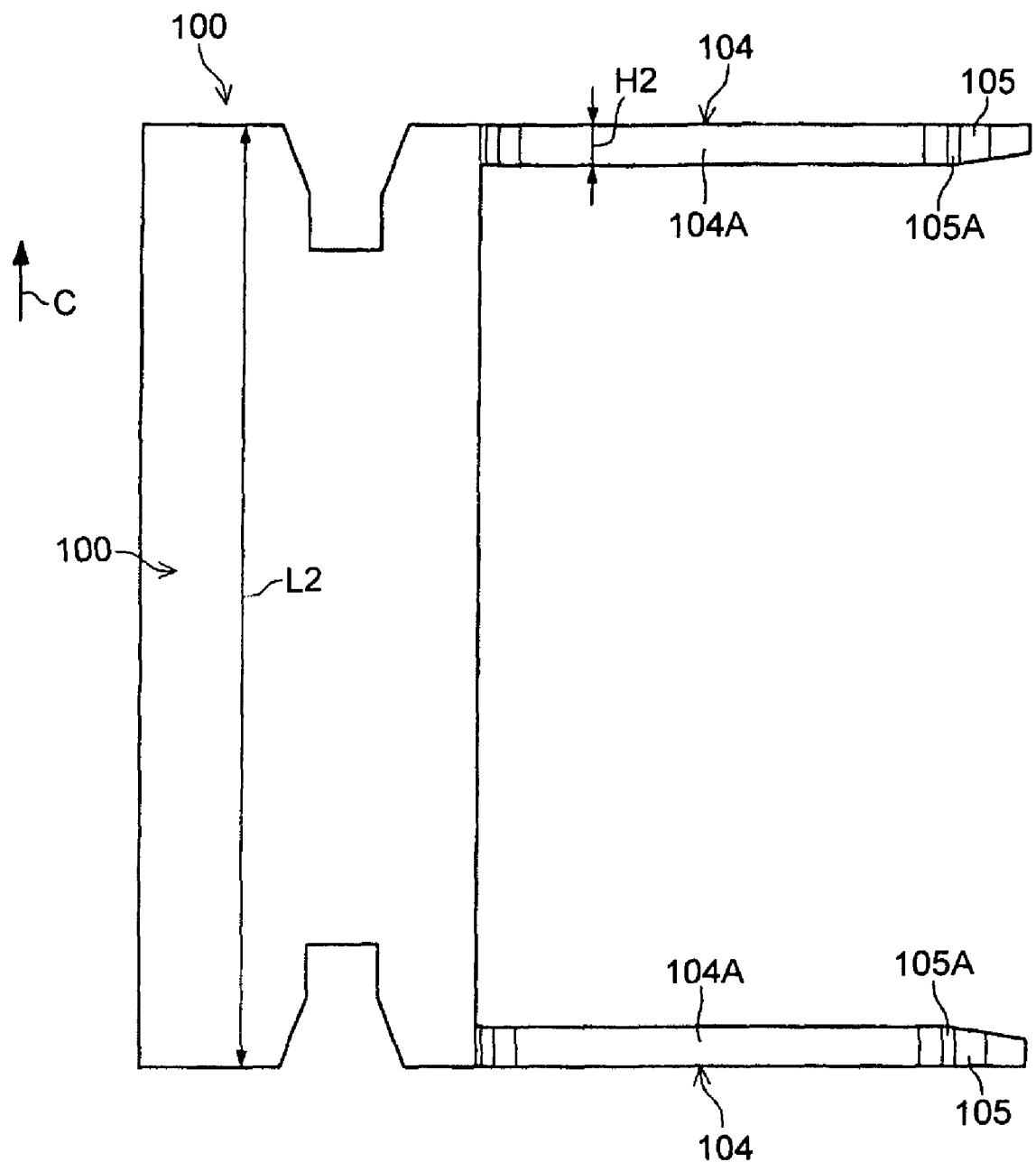
FIG. 14 illustrates, in plan view, another alternative retainer member incorporated in the leader pin retaining structure shown in FIG. 13.

FIGS. 13 and 14 show a magnetic tape cartridge 10 according to a second embodiment of the present invention. The magnetic tape cartridge 10 is provided with a leader pin retaining structure which is similar in structure and operation to that of the previous embodiment except that the leader pin retaining structure includes a different type of retainer member 100 and retaining grooves 45 for receiving the retainer member 100. As shown in FIG. 13, at least either one of the retaining grooves 45 has a bottom surface in flush with the recessed apron 49 cut into in each of the top and bottom plates of the upper and lower case halves (only the recessed apron 49 formed in the bottom plate 16A of the lower case half 16 is shown). On the other hand, as shown in FIG. 14, the retainer member 100, preferably made as a single integral piece of bifurcated leaf spring from a nonmagnetic metal sheet such as SUS, comprises a relatively rigid flat base portion 102 having a width L2 adjusted to a distance between the bottoms of the retaining grooves 45 and a pair of resilient arms 104 separated in a width direction of the flat base portion 102 and having generally V-shaped end portion 105 at tail ends, respectively. Each resilient arm 104 has a width H2 adjusted to the maximum width H1 of the retainer member 100 of the previous embodiment shown in FIG. 8. The V-shaped end portion 105 is tapered laterally inward and, however, has no outer straight rim.

The leader pin retaining structure thus configured is enabled to provide safe and secure press contact with the end collars 36 of the leading pin 30, respectively, thereby preventing the leading pin 30, 30A from dropping out of the magnetic tape cartridge 10, while showing much the same result as the previous leader pin retaining structure.

Figure 15:
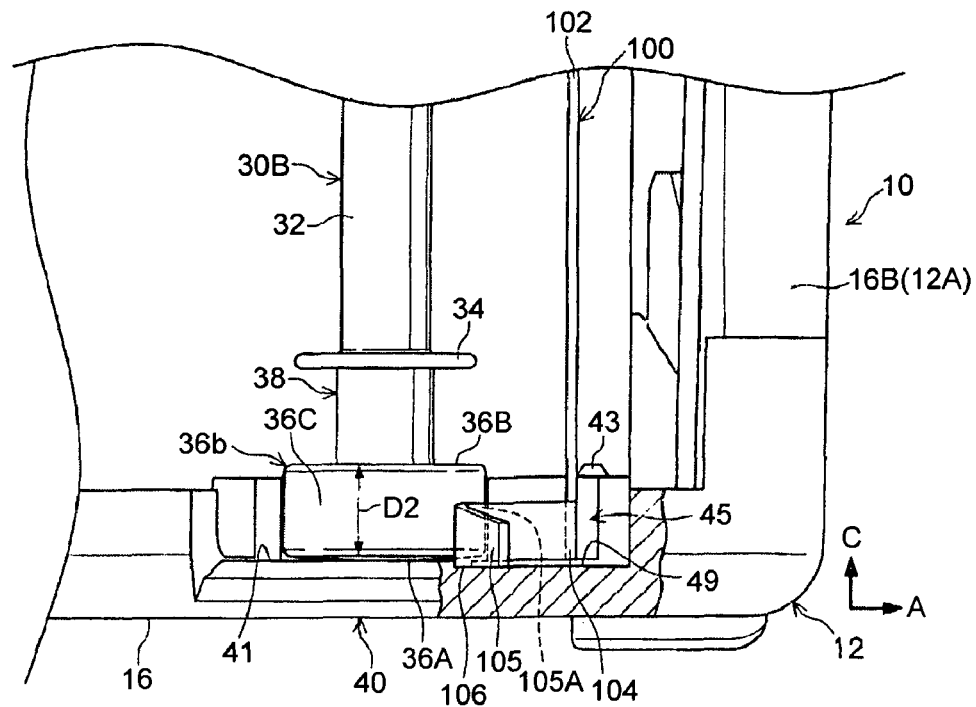
FIG. 15 illustrates, in detailed front view, an alternative leader pin retaining structure of a lower case half of the magnetic tape cartridge with a leader pin having thick end collars used therein, in which the retainer member shown in FIG. 8 is incorporated.

FIG. 15 shows a magnetic tape cartridge 10 according to a third embodiment which contains a leader pin having end collars increased in thickness. As shown, the magnetic tape cartridge 10 is adapted for use with a leader pin 30B which has end collars 36b having a thickness D2 (which is greater than a depth of the U-shaped recess 41). In this instance, the magnetic tape cartridge 10 is provided with a leader pin retaining structure, similar in structure and operation, to that of the previous embodiments except that the bracket 44 is removed. The leader pin retaining structure is provided with the retainer member 100 having the V-shaped end portions 105, each being expanded laterally outward from the outer edge of the main body portion 104A as the outer straight rim 106, shown in FIG. 8.

Figure 16:
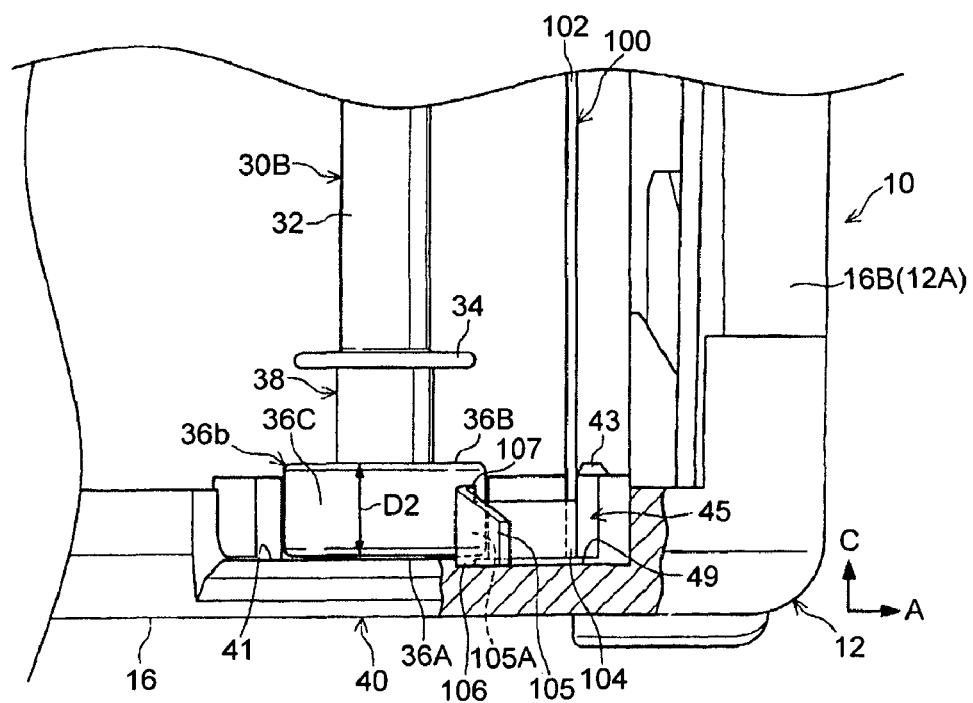
FIG. 16 illustrates, in detailed front view, the alternative leader pin retaining in which the retainer member shown in FIG. 9 or 10 is incorporated.

FIG. 16 shows an alternative magnetic tape cartridge 10 adapted for use with the leader pin 30B and, however, provided with a leader pin retaining structure slightly different from that shown in FIG. 15. That is, the leader pin retaining structure is basically identical in structure and operation with that shown in FIG. 15 except that the retainer member 100 shown in FIG. 9, or otherwise the retainer member 100 shown in FIG. 10, is substituted.

Figure 17:
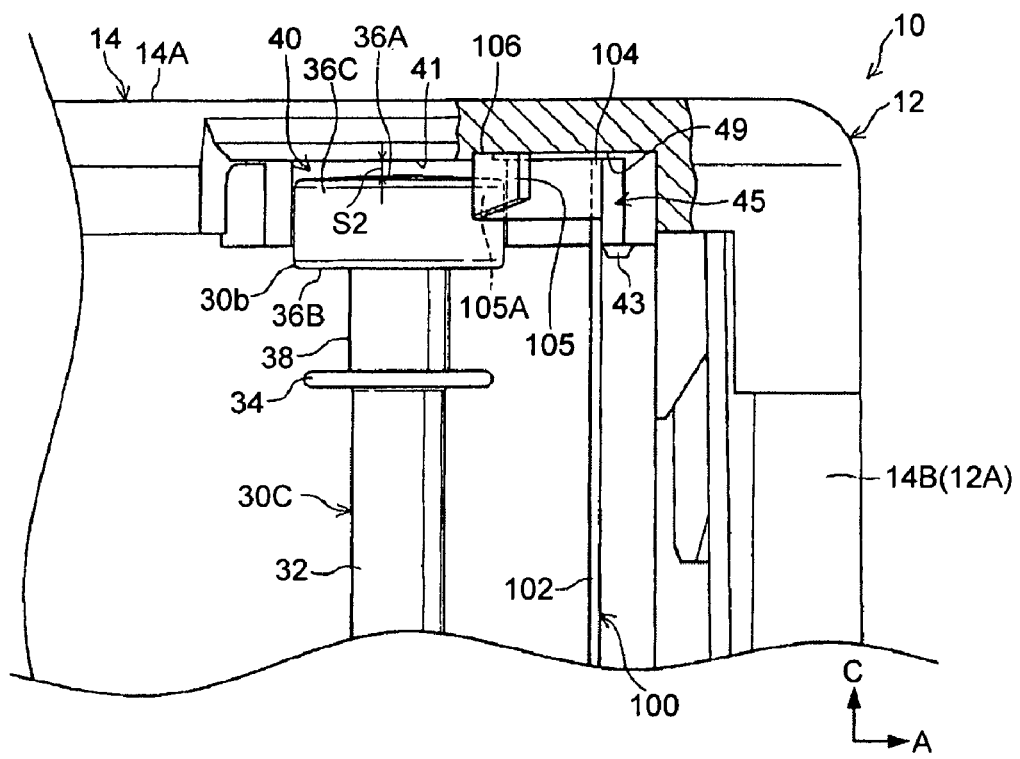
FIG. 17 illustrates, in detailed front view, an alternative leader pin retaining structure of an upper case half of the magnetic tape cartridge with a leader pin slightly shortened in length and having thick end collars used therein, in which the retainer member shown in FIG. 8 is incorporated.

FIG. 17 shows a further alternative magnetic tape cartridge 10 adapted for use with a leader pin 30C similar in configuration to the leader pin 30B and, however, slightly shorter in overall length than the leader pin 30B shown n FIG. 15. As shown, there is provided a small clearance S2 between the bottom of the leader pin socket 40 formed in the top plate 14A of the upper case half 14 and the top end 36A of the leader pin 30C received in the leader pin socket 40. In this instance, the magnetic tape cartridge 10 is provided with a leader pin retaining structure, similar in structure and operation, to that of the previous embodiments except that the bracket 44 is removed. The leader pin retaining structure is provided with the retainer member 100 having the V-shaped end portions 105, each being expanded laterally outward from the outer edge of the main body portion 104A as the outer straight rim 106, shown in FIG. 8.

Figure 18:
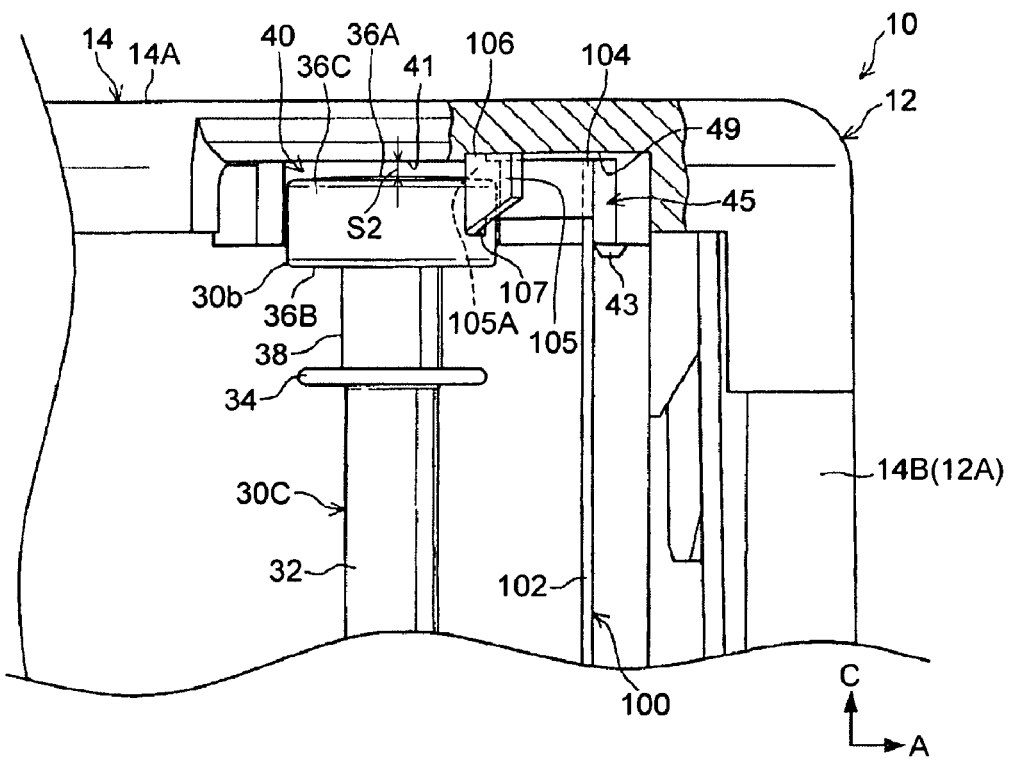
FIG. 18 illustrates, in detailed front view, the alternative leader pin retaining in which the retainer member shown in FIG. 9 or 10 is incorporated.

FIG. 18 shows a still further alternative magnetic tape cartridge 10 adapted for use with the leader pin 30B and, however, provided with a leader pin retaining structure slightly different from that shown in FIG. 17. That is, the leader pin retaining structure is basically identical in structure and operation with that shown in FIG. 17 except that the retainer member 100 shown in FIG. 9, or the retainer member 100 shown in FIG. 10, is substituted.

In any case, the leader pin retaining means including the retainer member 100 shown in FIG. 9 or 10 brings the V-shaped end portions 105 into reliable press contact with the end collars of the leading pin, respectively. Specifically, the retainer member presses against the end collars of the leading pin at the V-shaped end portions 105, respectively, by approximately equal pressure, so as to realize stable retention of the leader pin within the leader pin sockets 40, thereby preventing the leader pin from dropping off from the leader pin sockets 40.

Figure 19A:
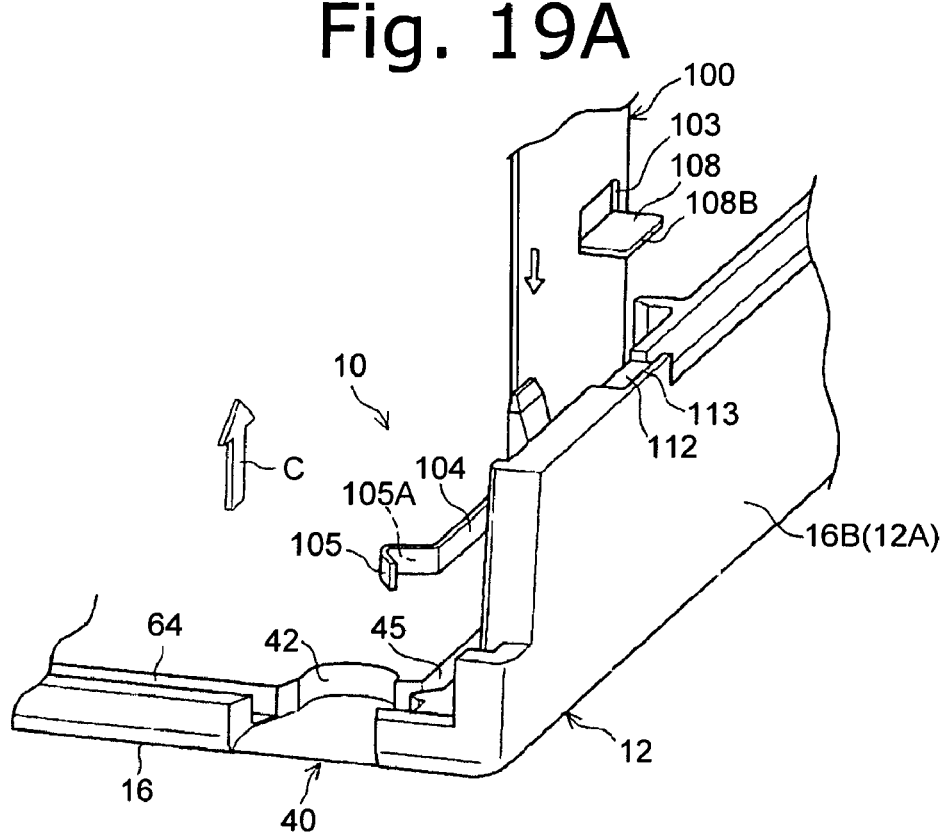
FIGS. 19A and 19B illustrate, in perspective overhead view, an alternative leader pin retaining structure equipped with mounting means of a lower case half of the magnetic tape cartridge.
Figure 19B:
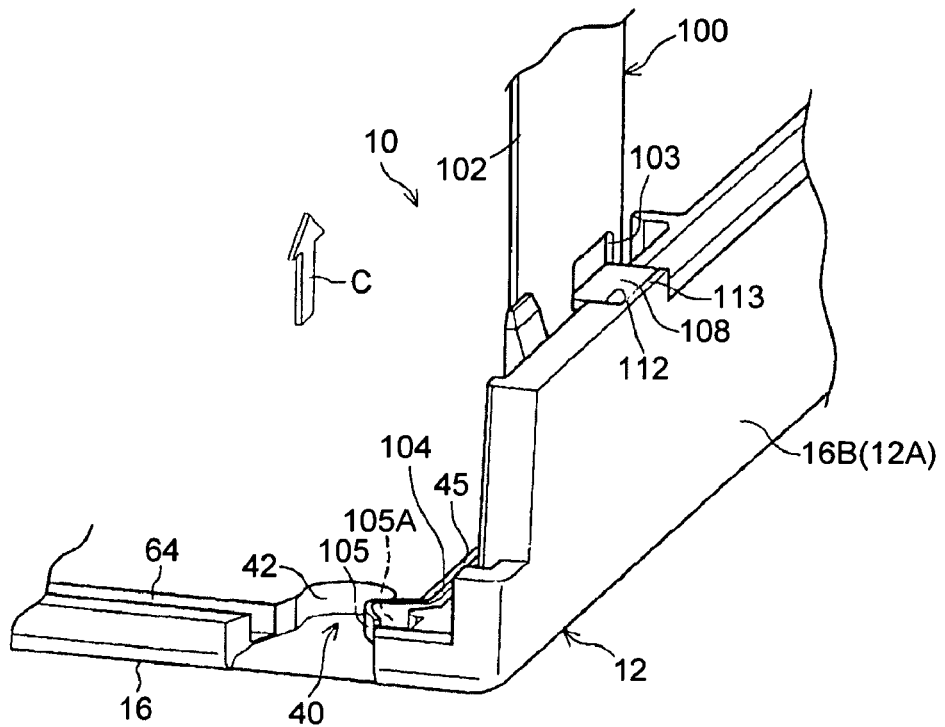

FIGS. 19A and 19B show a magnetic tape cartridge 10 according to a fourth embodiment in which the leader pin retaining structure is accompanied by a retainer member mounting structure having a profound effect on exact placement of the retainer member with respect to the leader pin. The retainer member mounting structure basically comprises a mounting tab formed as an integral part of the retainer member and a detention opening so formed in the peripheral walls of the cartridge case as to receive the mounting tab therein. The retainer member mounting structure serves as positioning means for exactly positioning the retainer member with respect to the cartridge case so as to achieve placement of the retainer member 100 with respect to the leader pin sockets, more respectively the leader pin received in the leader pin sockets, as designed. In this embodiment, the retainer member may take any form described above.

As shown, a retainer member 100, taking for example the form shown in FIG. 14, comprises a relatively rigid flat base portion 102 and a pair of resilient arms 104, each having a V-shaped end portion 105 at the tail end. The retainer member 100 has a rectangular mounting tab 108 formed, as an integral part of the flat base portion 102, at a midpoint in a width direction thereof. That is, the mounting tab 108 is in approximately flush with the top of the peripheral wall 16B of the lower case half 16 when the retainer member 100 is installed in the cartridge case 12. The mounting tab 108 is formed by making a U-shaped cut 103 in the midsection of the flat base portion 102 and bending the cut portion downward at an approximately right angle. The retainer member 100 thus configured is fixedly mounted to the cartridge case 12 by fitting the mounting tab 108 to the cartridge case 12 as described below.

In order to fixedly mount the retainer member 100 to the cartridge case 12, the cartridge case 12 has a generally rectangular detention recess 112 walled at 113 as an detention opening in which the mounting tab 108 of the retainer member 100 is fitted and stopped at a front edge 108B. The detention recess 112 is formed in a top of either one of the peripheral walls 14B and 16B of the upper and lower case halves 14 and 16, specifically in the top of the peripheral wall 16B of the lower case half 16 in this embodiment, in a predetermined transverse position. Otherwise, the detention recess 112 may be split into exact mating halves formed in tops of the peripheral walls 14B and 16B of the upper and lower case halves 14 and 16, respectively.

The detention recess 112 is configured complementarily to the mounting tab 108 of the retainer member 100, in other words, has dimensions (width and depth) approximately equal to these of the mounting tab 108 of the retainer member 100 so as to firmly fit to the mounting tab 108 of the retainer member 100 therein. The upper and lower case halves 14 and 16 are provided with retaining grooves 45 formed in the individual top and bottom plates 14A and 16A, respectively, and adapted for reception of opposite side portions of the retainer member 100 (only the retaining groove 45 formed in the bottom plate 16A of the lower case half 16 is shown). Each retaining groove 45 is adapted for reception of a lateral margin of the retainer member 100 in the same way as the previous embodiments.

According to the leader pin retaining structure thus configured, the retainer member 100 is installed in the cartridge case 12 by inserting the lower lateral margin of the retainer member 100 into the retaining groove 45 of the lower case half 16 and then fitting the mounting tab 108 of the retainer member 100 in the detention recess 112. Subsequently, while attaching the upper case half 14 to the lower case half 16, the upper lateral margin of the retainer member 100 is inserted into the retaining groove 45 of the upper case half 14, thereby assembling the upper case half 14 and the lower case half 16 to the cartridge case 12. As a result, the mounting tab 108 in the detention recess 112 is overborne by the top of the peripheral wall 14B of the upper case half 16, so that the retainer member 100 is fixedly mounted to the cartridge case 12 and located in predetermined vertical and transverse positions in the cartridge case 12 where the V-shaped end portions 105 of the retainer member 100 are well situated within the leader pin sockets 40, respectively.

More specifically describing in this regard, since the retainer member 100 is accurately installed in a predetermined position with respect to the cartridge case 12 by fitting the mounting tab 108 in the detention recess 112 while inserting the retainer member 100 in the retaining groove 45 in the top and bottom plates 14A and 16A of the upper and lower case halves 14 and 16, the resilient arms 104 received in the retaining grooves 45 locate the V-shaped end portions 105 in accurate positions with respect to the cartridge case 12, and hence the leader pin sockets 38a, in vertical, transverse and longitudinal directions. Therefore, the V-shaped end portions 105 of the retainer member 100 press against the end collars of the leading pin in intended positions, more specifically midsections of the side wall of the end collars of the leading pin, respectively, at approximately equal pressure.

The retainer member mounting structure may be provided with coupling means for reliably mounting of the retainer member to the cartridge case with the result that the retainer member achieves more exact placement of the V-shaped end portion with respect to the leader pin and is prevented from possible accidental fallout from the cartridge case. The coupling means may take various forms shown by way of example below.

Figure 20A:
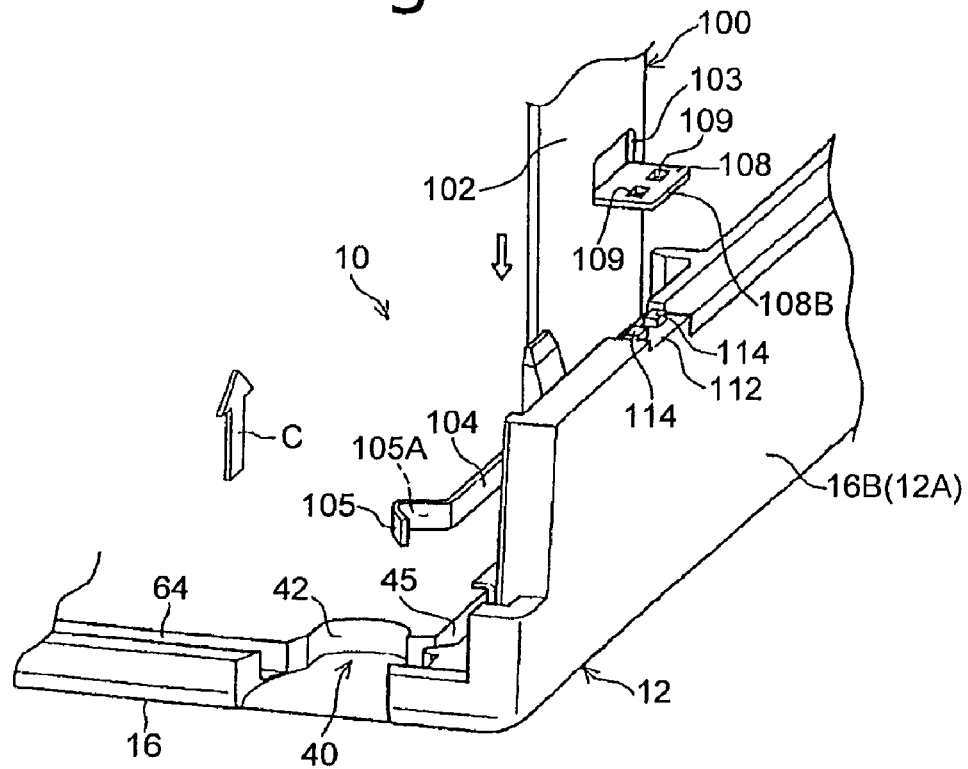
FIGS. 20A and 20B illustrate, in perspective overhead view, an alternative leader pin retaining structure equipped with mounting means of a lower case half of the magnetic tape cartridge, which has coupling feature.
Figure 20B:
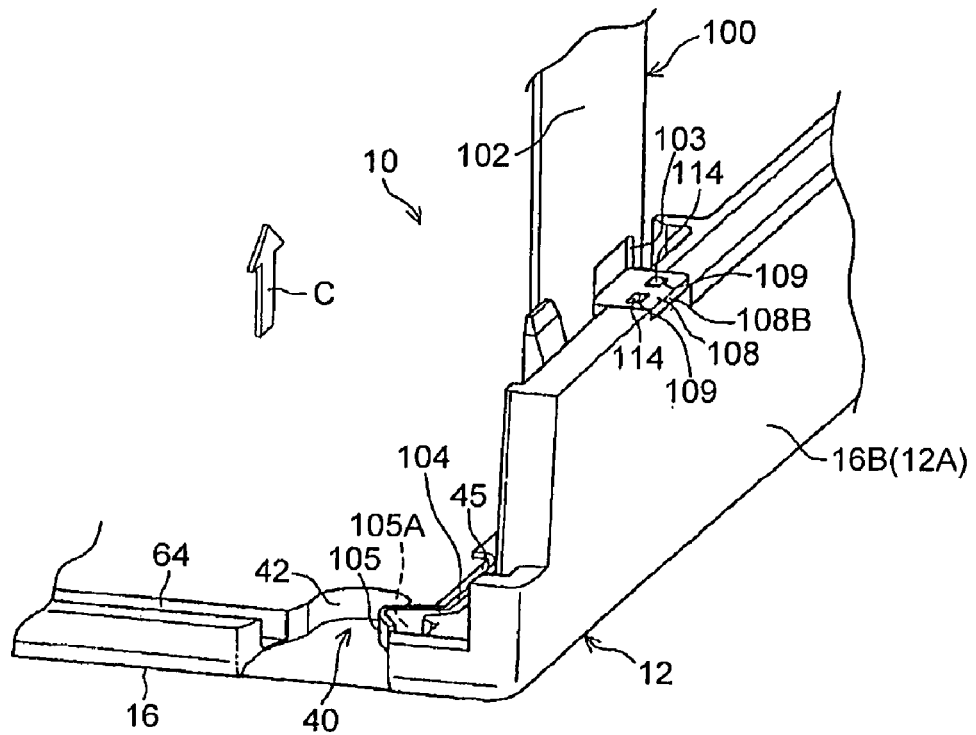

FIGS. 20A and 20B show the retainer member mounting structure provided with coupling means. As shown, the retainer member 100 has a rectangular mounting tab 108 having a pair of rectangular cutouts 109 arranged in a transverse direction. On the other hand, a rectangular detention recess 112, formed in the top of the peripheral wall 16B of the lower case half 16, is provided with a pair of rectangular bosses 114 which are extended upward to a height slightly lower than the depth of the detention recess 112. The cutouts 109 and the bosses 114 are so configured so as to couple to each other. In this instance, the mounting tab 108 may have less or more than two rectangular cutouts 109 and hence, the detention recess 112 has less or more than two bosses 114, correspondingly. The leader pin retaining structure thus configured ensures safe and secure mounting of the retainer member 100 to the cartridge case 12. When designing relative positions of the cutouts 109 and the bosses 114 with respect to the cartridge case 12, the retainer member 100 is assured to place the V-shaped end portion 105 with respect to the leader pin 30 received in the leader pin sockets 40 while showing much the same result as the previous leader pin retaining structure.

Figure 21:
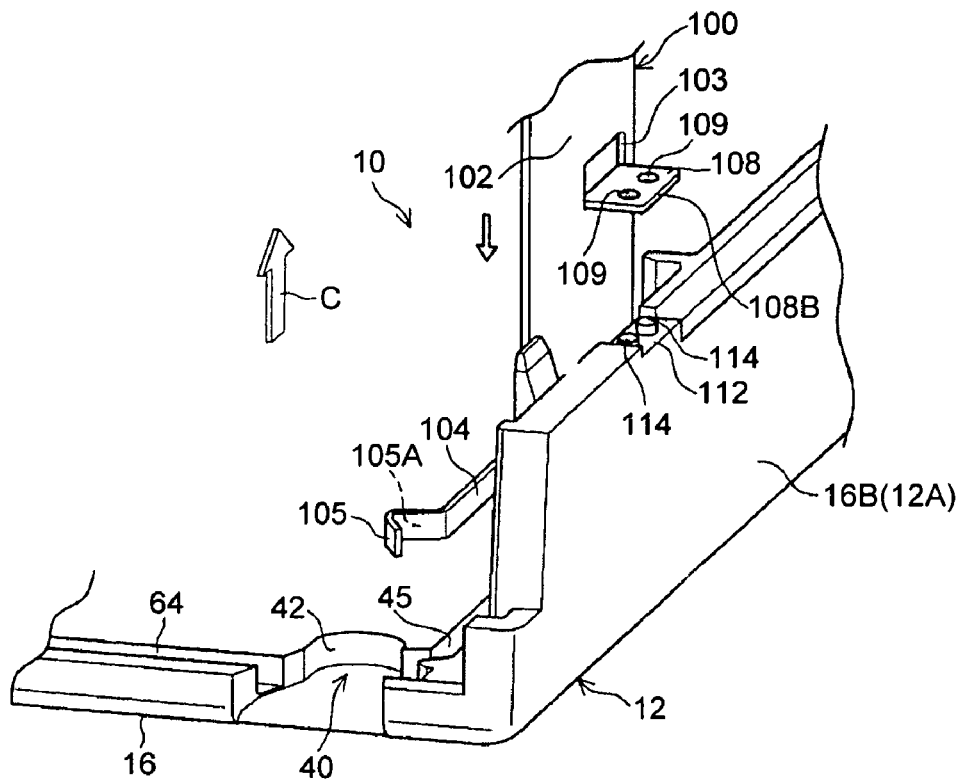
FIG. 21 illustrates, in perspective overhead view, the leader pin retaining structure equipped with mounting means in which alternative coupling means is incorporated.
Figure 22:
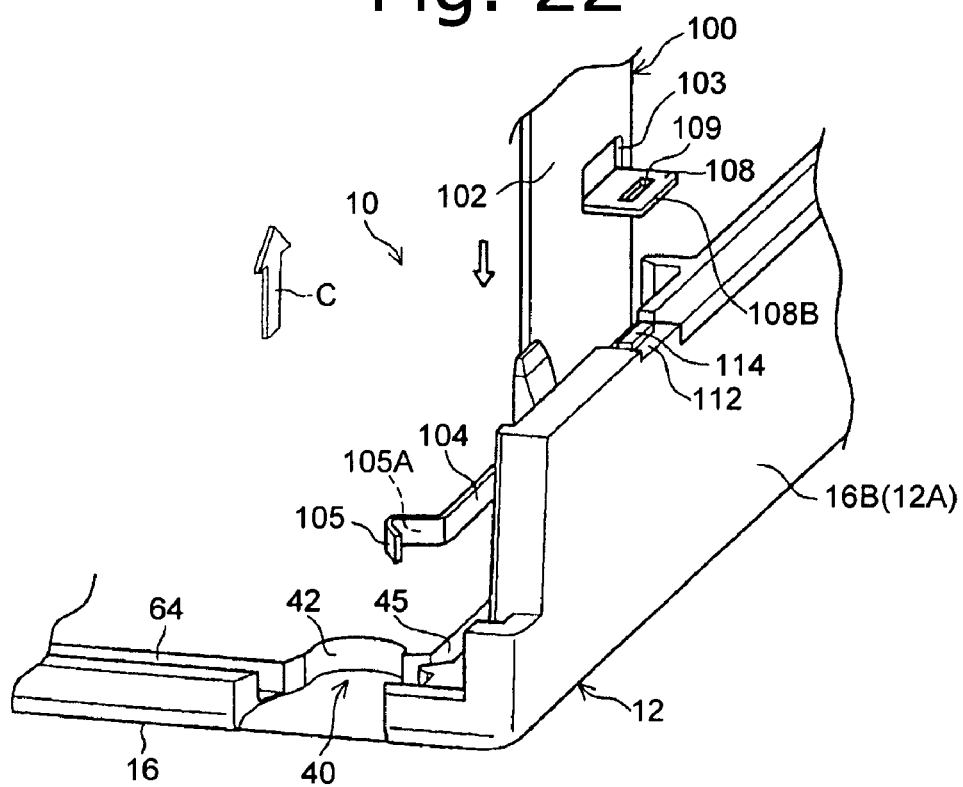
FIG. 22 illustrates, in perspective overhead view, the leader pin retaining structure equipped with mounting means in which another alternative coupling means is incorporated.

The retainer member mounting structure, more particularly the coupling means, may be altered in form. For example, the mounting tab 108 may have a pair of circular cutouts 109 as shown in FIG. 21 or a single elongated rectangular cutout 108A as shown in FIG. 22. In such a case, the detention recess 112 has a pair of circular bosses 114 or a single elongated rectangular boss 114, correspondingly. These alternative retainer member mounting structure show much the same result as the previous leader pin retaining structure. Further, the mounting tab 108 may be divided into two parts 108a, each having a single cutout 109 rectangularly shaped or circularly shaped, as shown in FIG. 23. In this case, the bosses 114 are shaped correspondingly to the shape of the cutout 109. In any modification described above, the boss 114, rectangular or circular, has a height slightly less than the depth of the detention recess 112.

Referring to FIG. 24 showing another alternative coupling means, the detention recess 112 has a pair of bosses 114, shaped rectangularly or circularly, each having a prismatic top end portion projecting out above the mounting tab 108 of the retainer member 100 received in the detention recess 112. The bosses 114 thus configured serve as an energy director when connecting the upper and lower case halves 14 and 16 together by ultrasonic welding. More specifically, during ultrasonic welding, the projecting top end portions of the bosses 114a are melted by ultrasonic waves, thereby fusing the peripheral walls 14B and 16B of the upper and lower case halves 14 and 16 together. This leader pin retaining structure, therefore, facilitates producing an excellent result of ultrasonic welding of the upper and lower case halves 14 and 16, while firmly mounting the retainer member 100 in position to the cartridge case 12.

Figure 25:
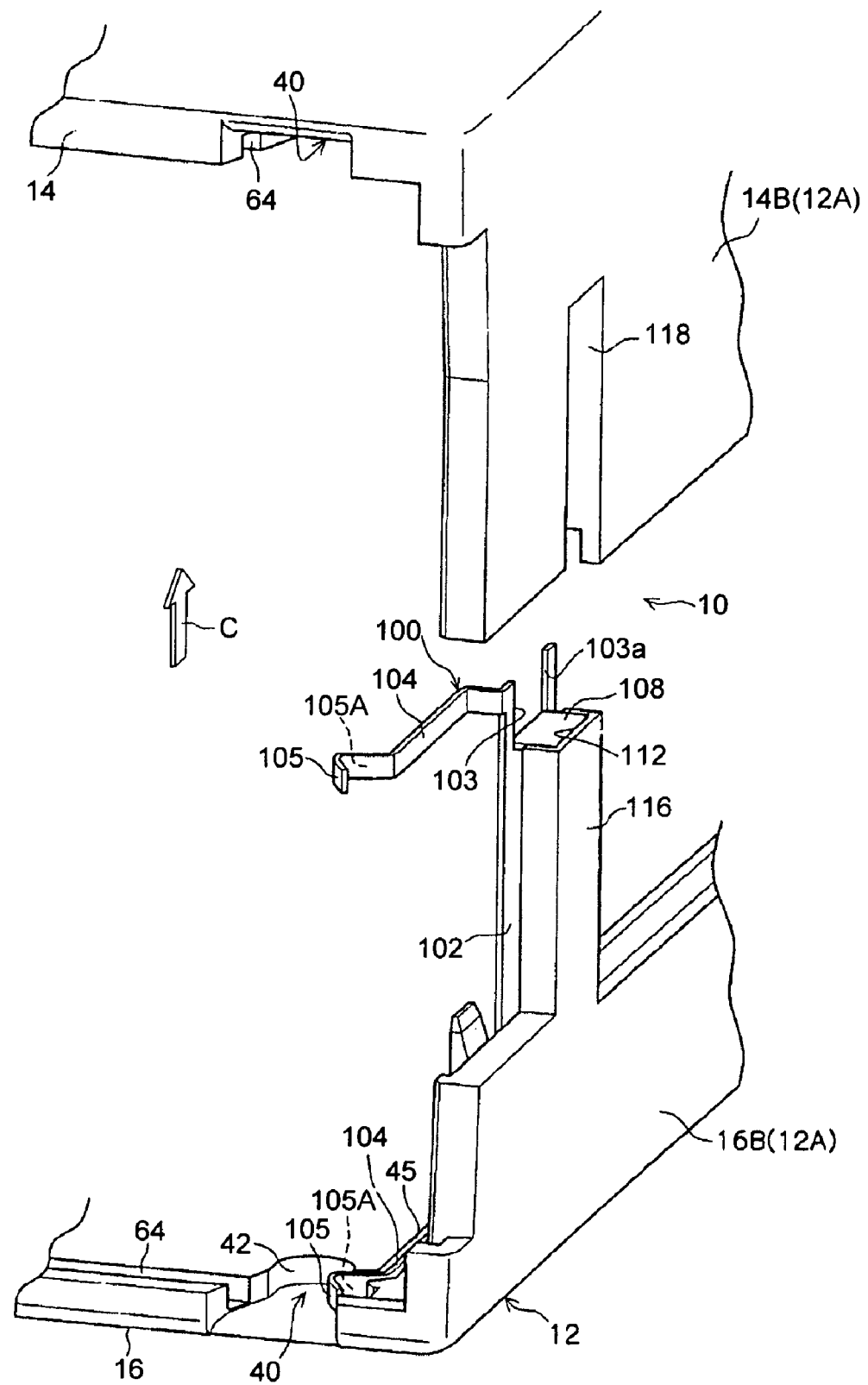
FIGS. 25 and 26 illustrate, in perspective overhead view, a leader pin retaining structure equipped with alternative mounting means of the magnetic tape cartridge.

FIG. 25 show an alternative leader pin retaining structure which is basically similar in structure and operation to the previous ones except that the retainer member mounting structure is altered. As shown, the retainer member 100 has a rectangular mounting tab 108 formed by making parallel cuts 103a in a side marginal portion of the flat base portion 102 of the retainer member 100 and bending the cut portion downward at an approximately right angle. On the other hand, the lower case half 16 has a vertical square column 116 extending upward from the peripheral wall 16B and having a rectangular walled detention recess 112 formed at the top thereof. The upper case half 14 has a vertical opening 118 formed in and extending from the top of the peripheral wall 14B. These square column 116 and opening 118 are coadapted for complementary pairing. More specifically, the square column 116 is snugly fitted in the opening 118 without leaving any gap therebetween when the upper and lower case halves 14 and 16 are assembled to the cartridge case 12. Further, the square column 116 is so adjusted in height that the mounting tab 108 fitted in the detention recess 112 is firmly overborne by the peripheral wall 14B when the upper and lower case halves 14 and 16 are assembled to the cartridge case 12.

Figure 26:
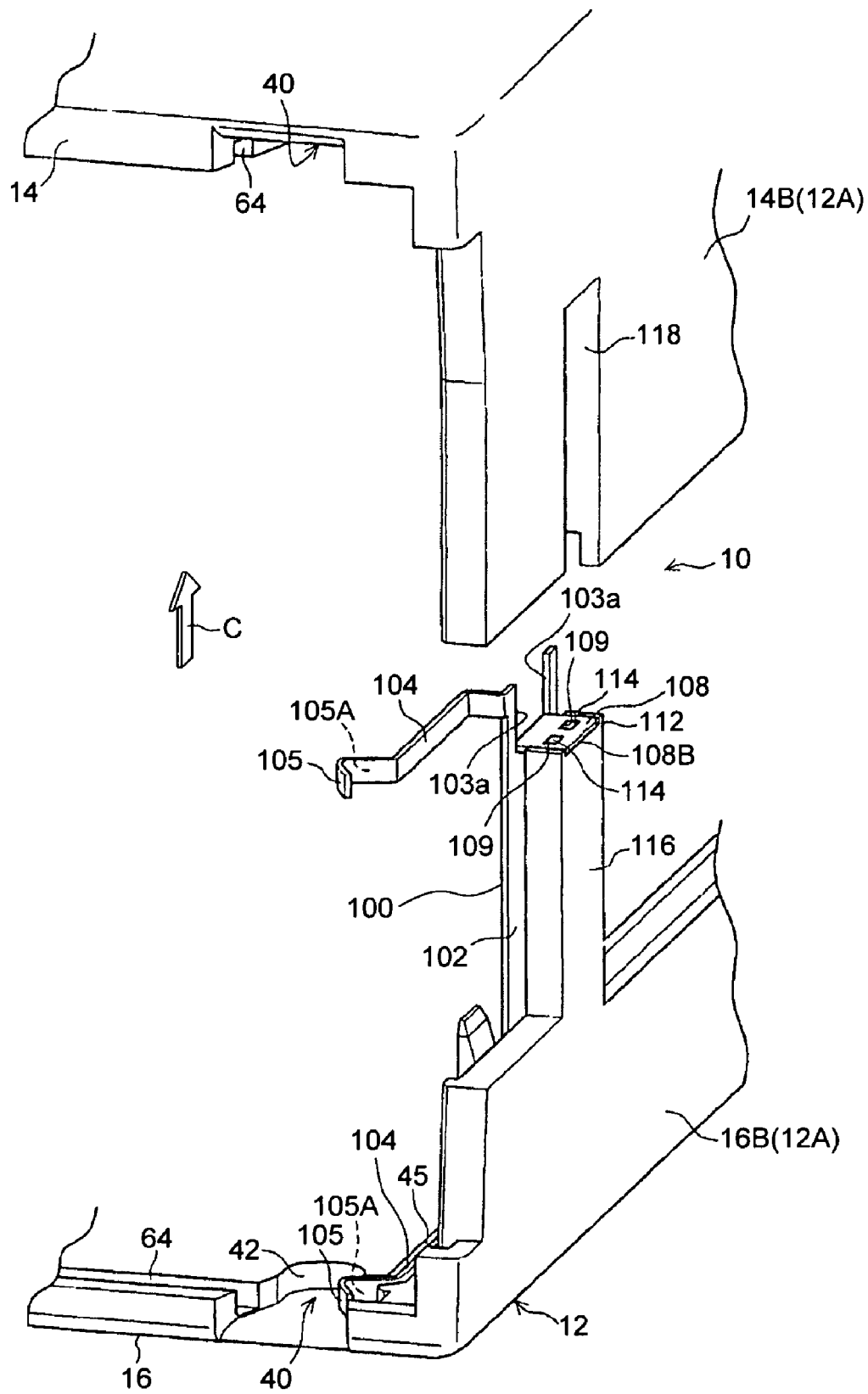

Referring to FIG. 26, the retainer member mounting structure thus configured may be provided with coupling means. As shown, the retainer member 100 has a rectangular mounting tab 108 having a pair of rectangular cutouts 109 arranged in a transverse direction. Correspondingly, the rectangular detention recess 112 is provided with a pair of rectangular bosses 114a which are extended upward to a height slightly lower than the depth of the detention recess 112. The cutouts 109 and the bosses 114 are so configured so as to couple to each other. It is of course that the coupling means may take various forms such as previously described.

According to the leader pin retaining structure thus configured, the retainer member 100 is fixedly situated in predetermined vertical and transverse positions in the cartridge case 12 so as to place the V-shaped end portions 105 of the resilient arms 104 in a designed position within the leader pin sockets 40, respectively. Therefore, the leader pin 30 is firmly and securely retained in the leader pin sockets 40 of the cartridge case 12 and prevented from slipping out of the leader pin sockets 40 while the magnetic tape cartridge is in no use. Furthermore, the leader pin retaining structure improves installation facility of the retainer member 100 into the cartridge case 12. In this instance, while the leader pin retaining structure is disadvantageous to the upper and lower case halves 14 and 16 in view of complexity of shape, nevertheless, in return for this, formation of the mounting tab 108 of the retainer member 100 is facilitated. Specifically, it is an easier task to form the mounting tab 108 in the side margin of the flat base portion 102 of the retainer member 100 than in the midsection of the flat base portion thereof.

It is to be understood that, although the magnetic transfer apparatus has been described taking a horizontal axis type as an example, it may be of a vertical axis type and of an inclined axis type. It is also to be understood that although the present invention has been described with regard to preferred embodiments thereof, various other embodiments and variants may occur to those skilled in the art, which are within the scope and spirit of the invention, and such other embodiments and variants are intended to be closed by the following claims.

What is claimed is:

1. A magnetic tape cartridge comprising:
   a substantially rectangular cartridge case formed by upper and lower case halves joined together, said cartridge case having an opening formed between said upper and lower case halves in one corner thereof;
   a tape reel assembly with a magnetic tape wound thereto, said tape reel assembly being rotatably enclosed in said cartridge case;
   a leader pin comprising having end collars at opposite ends thereof, respectively, said leader pin being attached to a leading end of said magnetic tape and being pulled in and out through said opening;

a retainer member having a pair of resilient arms separated in parallel with each other, each said resilient arm having a tail end portion;

support means for supporting said retainer member including said resilient arms except said tail end portions; and leader pin socket means, provided adjacent to said opening in said cartridge case for holding said leader pin in a predetermined position and having upper and lower front aprons, formed in said upper and lower case halves, respectively, for clearing the way for insertion of said leader pin into said leader pin socket means, each said front apron having a bearing surface so as to bear said end collar thereon;

wherein said support means comprises a support groove, formed in each of said upper and lower case halves, in which at least each said resilient arm is received, urging means, provided in said support groove, for urging and bending said resilient arm so as to charge said resilient arm with resilience, and a recessed apron continued from said support groove, said recessed apron lying between said bearing surface of each said front apron and each said support groove and being depressed below said bearing surface of said front apron and partly extending into said front apron so as to admit movement of each said tail end portion of said resilient arm;

wherein said supporting means resiliently urges and bends each of said resilient arms of said retainer member so as to place said tail end portion of said each resilient arm in a pathway of said end collar of said leader pin while charging said resilient arm with resilience, thereby retaining said end collars of said leader pin by said tail end portions of said resilient arms, respectively.

2. The magnetic tape cartridge as defined in claim 1, wherein said leader pin socket means further comprises at least one bracket formed so as to partly overlap one of said end collars of said leader pin received in said leader pin socket means.

3. The magnetic tape cartridge as defined in claim 1, wherein said tail end portion of at least either one of said resilient arms has a width greater than said resilient arm.

4. The magnetic tape cartridge as defined in claim 3, wherein said tail end portion of at least either one of said resilient arms is extended laterally outward as an outer rim.

5. The magnetic tape cartridge as defined in claim 3, wherein said tail end portion of at least either one of said resilient arms is extended laterally outward and inward as outer and inner rims, respectively.

6. The magnetic tape cartridge as defined in claim 1, further comprising mounting means for fixedly mounting said retainer member to said substantially rectangular cartridge case in a predetermined position with respect to said leader pin socket means.

7. The magnetic tape cartridge as defined in claim 6, wherein said mounting means comprises a mounting tab formed as an integral part of said retainer member and a detention opening, formed complementarily to said mounting tab in a peripheral wall of said substantially rectangular cartridge case, into which said mounting tab is fitted.

8. The magnetic tape cartridge as defined in claim 7, wherein said detention opening comprises a recess formed in a top of a peripheral wall of at least one of said upper and lower case halves.

9. The magnetic tape cartridge as defined in claim 7, wherein said mounting means comprises coupling means, provided between said mounting tab and said recess, for coupling said retainer member to said cartridge case, said coupling means comprising at least one pair of depression and projection engageable with each other.

10. The magnetic tape cartridge as defined in claim 9, wherein said boss is formed to extend passing through said opening of said mounting tab.

* * * * *